(12) United States Patent
Springer et al.

(10) Patent No.: US 7,574,715 B2
(45) Date of Patent: Aug. 11, 2009

(54) DISK DRIVE MEDIA ACCESS SYSTEM

(75) Inventors: Greg Springer, Sunnyvale, CA (US);
Chris Ligtenberg, San Carlos, CA (US);
Bartley K. Andre, Menlo Park, CA (US); Brett William Degner, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 518 days.

(21) Appl. No.: 11/161,040

(22) Filed: Jul. 20, 2005

(65) Prior Publication Data

US 2007/0019374 A1    Jan. 25, 2007

(51) Int. Cl.
*G11B 13/04* (2006.01)

(52) U.S. Cl. .................................... 720/647

(58) Field of Classification Search ............... None
See application file for complete search history.

(56) References Cited

U.S. PATENT DOCUMENTS

| | | | |
|---|---|---|---|
| 4,759,646 A | 7/1988 | Piatt ........................... 400/88 |
| 5,450,377 A * | 9/1995 | Eom ........................ 369/13.2 |
| 5,513,067 A | 4/1996 | Ishihara et al. .............. 361/684 |
| 5,905,632 A | 5/1999 | Seto et al. |
| 6,068,496 A | 5/2000 | Penate ........................ 439/140 |
| 6,102,721 A | 8/2000 | Seto et al. |
| 6,178,084 B1 | 1/2001 | Shibasaki |
| 6,208,506 B1 | 3/2001 | Pao |
| 6,261,715 B1 | 7/2001 | Nakamura et al. .......... 429/100 |
| 6,304,459 B1 | 10/2001 | Toyosato et al. ............ 361/861 |
| 6,373,693 B1 | 4/2002 | Seto et al. |
| 6,507,485 B2 | 1/2003 | Zadesky ..................... 361/683 |
| 6,510,048 B2 | 1/2003 | Rubenson et al. ........... 361/680 |
| 6,621,691 B2 | 9/2003 | Howell |
| 6,697,941 B2 | 2/2004 | Kahler et al. |
| 6,785,126 B2 | 8/2004 | Hazzard et al. ............. 361/680 |
| 6,819,961 B2 | 11/2004 | Jacobs et al. .................. 700/17 |
| 6,888,532 B2 | 5/2005 | Wong et al. ................. 345/156 |
| 2003/0128475 A1 | 7/2003 | Wehrenberg |
| 2004/0252403 A1 | 12/2004 | Wehrenberg |
| 2005/0128676 A1 | 6/2005 | Homer et al. ............... 361/300 |
| 2005/0185527 A1 | 8/2005 | Lin et al. |

* cited by examiner

*Primary Examiner*—Mark Blouin
(74) *Attorney, Agent, or Firm*—Kramer Levin Naftalis & Frankel LLP

(57) ABSTRACT

A disk drive media access system opens a media access door to the interior of a disk drive sufficiently for ejection of disk media from the disk drive but insufficiently for manually engaging and removing disk media that is operationally positioned within the disk drive. The disk media is kept substantially laterally stationary during the opening of the media access door. The disk media is moved sufficiently for manually engaging the disk media for removing the disk media from the disk drive.

14 Claims, 19 Drawing Sheets

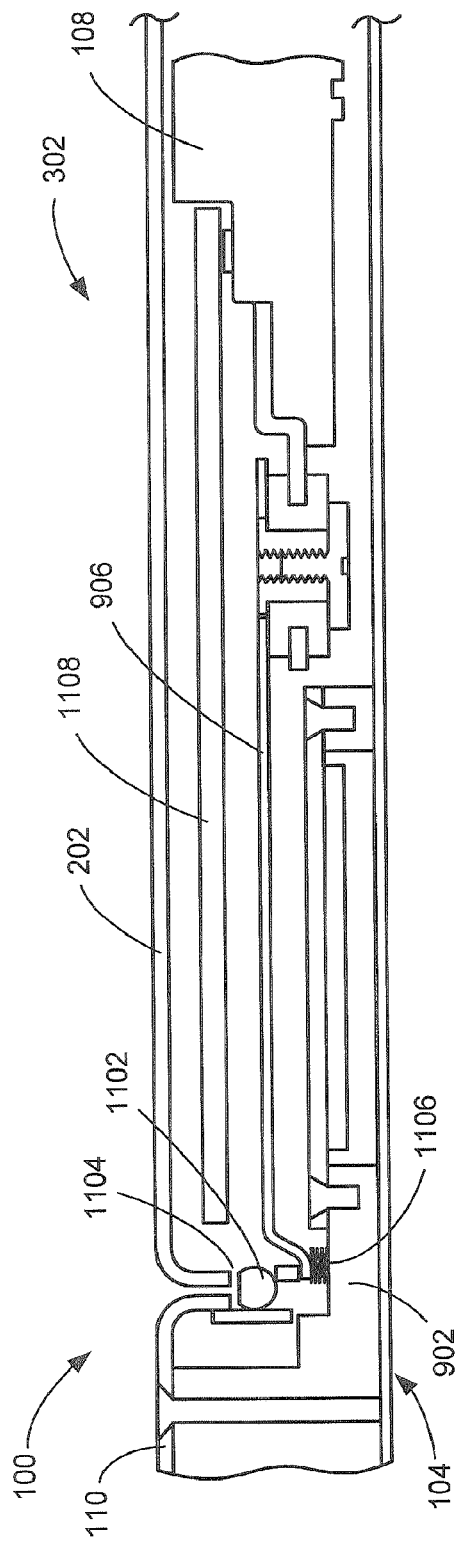
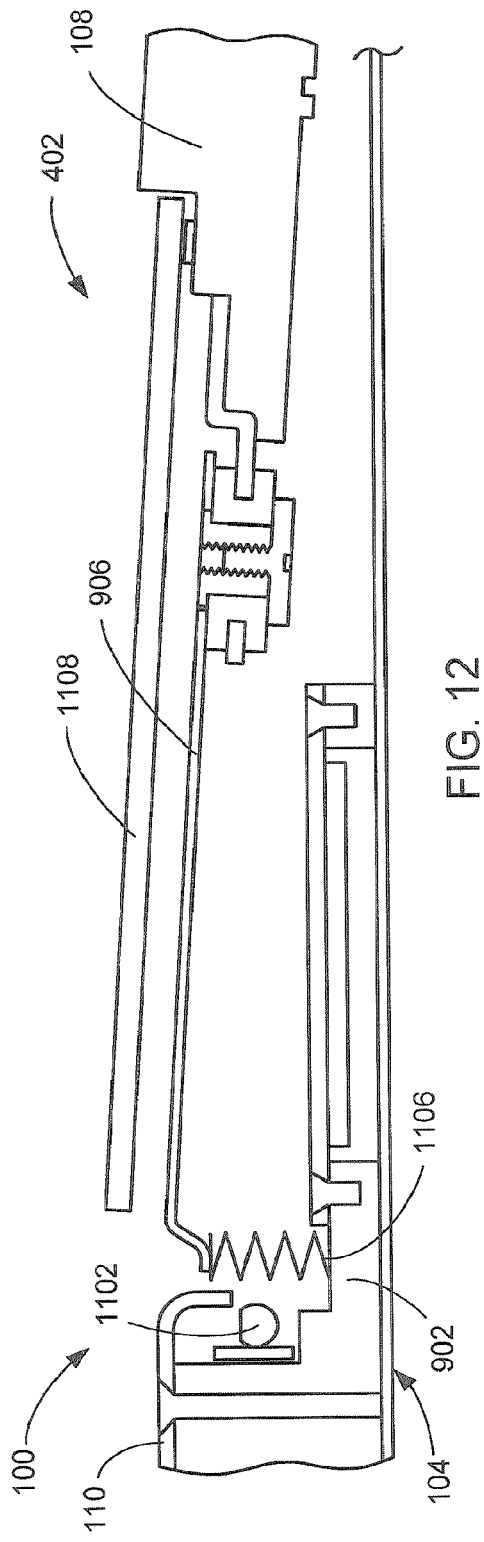
FIG. 11
FIG. 12

DISK DRIVE MEDIA ACCESS SYSTEM

CROSS-REFERENCE TO RELATED APPLICATION

The present application contains subject matter related to a concurrently filed U.S. Patent Application by Chris Ligtenberg, Greg Springer, Bartley K. Andre, and Brett William Degner entitled "Access System for a Portable Device". The related application is assigned to Apple Computer, Inc. and is identified by docket number P3786US1. This application is being filed contemporaneously herewith, and the subject matter thereof is hereby incorporated herein by reference thereto.

TECHNICAL FIELD

The present invention relates generally to disk drives, and more particularly to disk drive media access systems such as access systems for optical disk drives in portable computers.

BACKGROUND ART

Computers are becoming increasingly powerful, lightweight, and portable. The computing power of a computer that once filled an entire room now resides in a computer that sits on a desktop. Due to continuing advances in technology over the past several years, the size of these personal computers has steadily decreased while the performance has steadily increased. As a result, the use of portable computers, and particularly portable "laptop" computers, has increased dramatically during that same period of time. These portable computers have become virtually as powerful as their desktop counterparts. Even smaller hand-held computers are now capable of computing tasks that just a few short years ago required much larger computing machines.

The portability of laptop computers enables a user to perform tasks conveniently and to access computing resources wherever and whenever desired. For example, a wirelessly networked portable computer running on a battery pack enables a user to access computational resources without the requirement of an external electrical source and free of the need to connect to a wired network link.

Contemporary portable computers have a lid display section that pivots or rotates with respect to a base section of the computer. The lid moves between a closed position that places the lid against the base and an open position that exposes a display screen and various other components, such as a computer keyboard.

The lid display section includes the display screen. The base section carries various components used for operating the portable computer. These components typically include a keyboard, a track pad or other cursor positioning device, a central processing unit ("CPU"), a power supply, memory, a floppy disk drive, a hard disk drive, an optical disk drive ("ODD"), other data storage devices, network connection and interface devices, and so forth.

The network connection and interface devices may be, for example, connectors, ports, or wireless radio devices that enable the portable computer to communicate with external sources and peripheral devices such as a computer network, a printer, a serial device such as a mouse, a scanner, a docking station, and so forth. Connectors or ports may also enable the portable computer to interface with an electrical power source or power supply.

Connectors and ports associated with a portable computer are often located on the sides or the rear of the base section. Occasionally, incidental access is also provided through the bottom of the portable computer, for example for access to the computer's batteries. Often, connectors and ports are covered by manually accessed doors to protect the connectors and ports, e.g., from damage while the portable computer is being transported.

In portable computers, traditional ODD modules are self-contained units having their own enclosures and their own electromagnetic interference ("EMI") shielding. If mounted within the portable computer, the ODD modules are mounted along one side or perimeter edge thereof (typically the left, front, or right side edge). Access for inserting and removing a disk (such as a compact disk ("CD") or a digital versatile disk ("DVD")) is then commonly provided through the adjacent side of the portable computer housing (so-called "sidewall access" or "side-access").

As portable computers continue to become thinner and thinner, placement of the ODD is becoming increasingly problematic. For example, the available area on the perimeter edge surfaces of the base of the computer housing (available "real estate") diminishes as the thickness of the portable computer diminishes. Such real estate consequently becomes increasingly valuable as other services compete for use of the same diminishing resources. However, relocating the ODD away from the perimeter edge of the computer housing base poses problems and dilemmas that require solutions that have heretofore been deficient.

One important consideration in the placement of the ODD is the convenience afforded to the user of the portable computer when inserting and removing a disk from the ODD. Users have become accustomed to intuitive user interfaces and convenient access to the ODD through the real estate along the side edges of the portable computer housing. Any reconfiguration, therefore, of the user interface for the ODD must take into account user expectations, efficiency, and convenience. It must not be unintuitive or counter-intuitive.

Side edge access involves moving the disk horizontally, parallel to the plane of the disk. Removal of the disk from the portable computer or other portable device is thus relatively simple, because major portions of the flat surfaces (top and bottom) of the disk can be easily presented to the user. Thus, even a person with large fingers can easily grasp and remove the disk from the portable computer.

However, when disk access is provided through a door which does not shift or move the disk laterally out of the portable computer, it can be much more difficult for the user to engage and remove the disk. Also, the disk access mechanism itself may be vulnerable to accidental damage. Therefore, to enable the user to grab the disk, such a portable device must present an opening that is large enough for the user to grasp the sides of the disk and pry it off the hub latch of the ODD. The opening must therefore be large enough to accommodate both the disk and the fingers of the user, with additional appropriate clearance to accommodate the disk removal action. This can be a substantial design burden as portable computers and portable devices become smaller and smaller. As sizes shrink, it is increasingly costly both from a design standpoint and from a functionality standpoint to have an unnecessarily large access door and open, wasted space around the periphery of the disk.

An access door that opens outwardly from a portable computer can also be particularly vulnerable to damage, especially damage to the door hinge mechanism. When opened, even a modest force to the door can easily and quickly damage the door hinge due to the leverage of the force as it is applied to the hinge. The vulnerability of such door hinges thus only further complicates and aggravates efforts to move away from side-access disk mechanisms. As a result, side-access continues to be a popular solution, notwithstanding the considerable disadvantages from a design, implementation, and cost standpoint.

Thus, a need still remains for solutions for efficiently and economically providing better user access to disk drives in an ergonomically user-friendly manner, and to readily accommodate changeable media for use with such drives. In view of the ever-increasing commercial competitive pressures and consumer expectations, and the diminishing opportunities for meaningful product differentiation in the marketplace, it is increasingly critical that answers be found to these problems. Moreover, the ever-increasing need to save costs, improve efficiencies, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a disk drive media access system. The disk drive media access system opens a media access door to the interior of a disk drive sufficiently for ejection of disk media from the disk drive but insufficiently for manually engaging and removing disk media that is operationally positioned within the disk drive. The disk media is kept substantially laterally stationary during the opening of the media access door. The disk media is moved sufficiently for manually engaging the disk media for removing the disk media from the disk drive.

Certain embodiments of the invention have other advantages in addition to or in place of those mentioned above. The advantages will become apparent to those skilled in the art from a reading of the following detailed description when taken with reference to the accompanying drawings.

BRIEF DESCRIPTION OF THE DRAWINGS

FIG. 11 is a figurative, fragmentary cross-sectional view of a portion, in the closed position, of the housing base incorporating the tilt tray shown in FIG. 9;

FIG. 12 is a view similar to FIG. 11 after releasing a latch and moving to the open position;

BEST MODE FOR CARRYING OUT THE INVENTION

Figure 1:
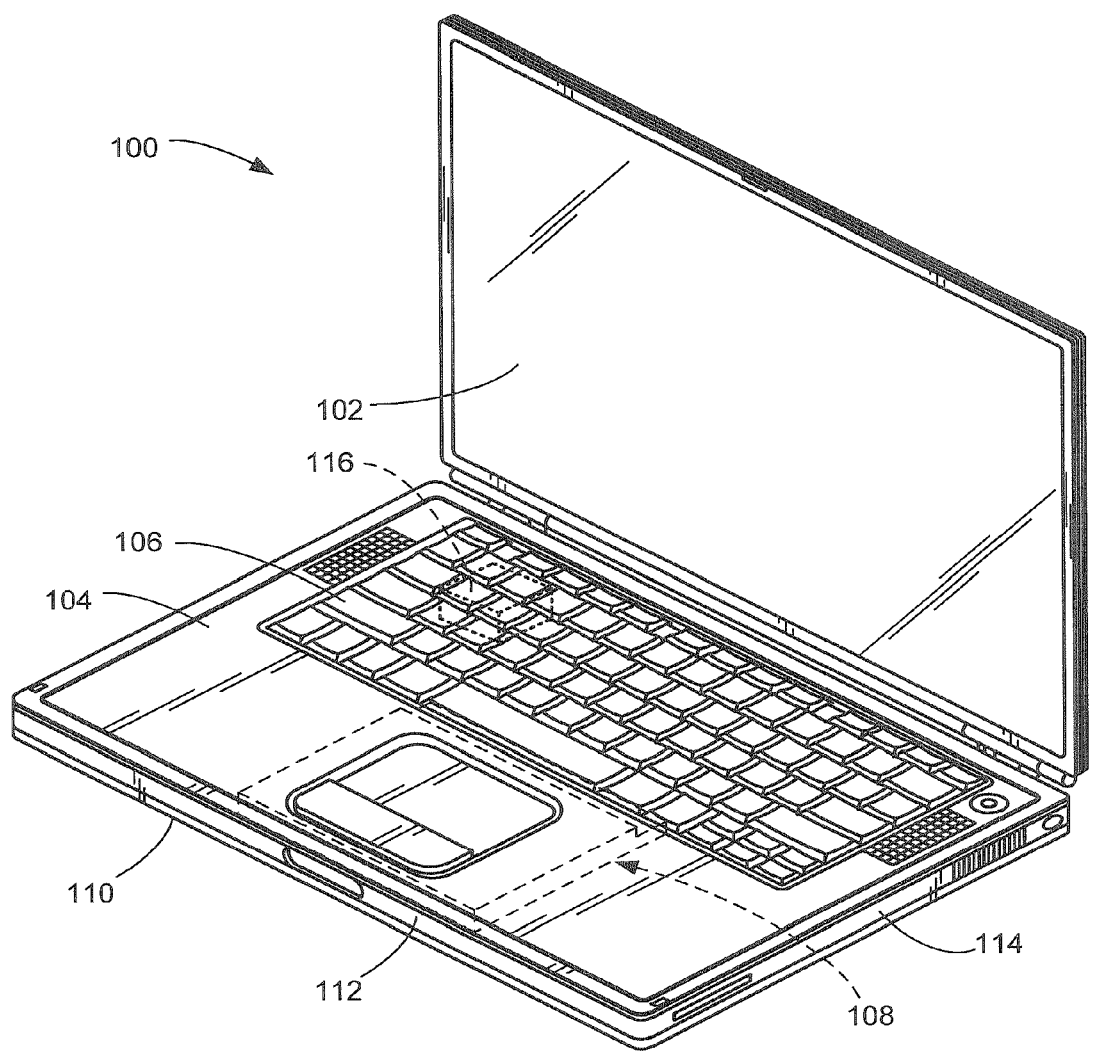
FIG. 1 is a view of a portable computer with a display mounted and hinged to a housing base in accordance with the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and operational steps are not disclosed in detail.

Likewise, the drawings showing embodiments of the devices are semi-diagrammatic and not to scale and, particularly, some of the dimensions are for the clarity of presentation and are shown exaggerated in the drawing FIGS. Also, where multiple embodiments are disclosed and described having some features in common, for clarity and ease of illustration, description, and comprehension thereof, similar and like features one to another will ordinarily be described with like reference numerals.

As used herein, the term "personal computer" refers to general-purpose microcomputers that are typically designed to be operated by one person at a time. The term "portable computer" is used herein to refer very broadly to personal computers that are designed and configured to be used in a mobile context, as distinguished from, for example, a "desktop computer" which typically is not considered to be mobile but is instead designed to be used typically in a single location. As used herein, therefore, the term "portable computer" includes, but is not limited to, "laptop computers" (a portable personal computer of a size suitable to rest comfortably on one's legs), "luggable computers" (portable, but not comfortably), "personal digital assistants" ("PDAs") and "palmtops" (easily carried in one hand or a shirt pocket), "notebook computers" (intermediate between laptop computers and palmtops), and so forth.

As used herein, the term "portable device" denotes a personal electronic device having mobility attributes analogous to those of a portable computer, and includes, but is not limited to, cell phones, portable personal music players, and so forth.

The term "bottom" as used herein is defined as that surface of a portable computer, portable device, or analogous portable system that is opposite the surface thereof that has or is generally surrounded by the device's user controls.

The term "horizontal" as used herein is defined as a plane parallel to the bottom of the portable computer, portable device, or portable system. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane, unless understood otherwise within and as a result of a particular context.

In portable computers, traditional, self-contained optical disk drive ("ODD") modules are mounted along one side edge of the portable computer, with access for inserting and removing a disk through the side of the portable computer housing. However, as portable computers become thinner, ODD side edge placement is increasingly challenging. One reason is the diminishing and increasingly valuable perimeter edge surface real estate of the computer housing.

To move the ODD access to another location, however, presents unique challenges that make any such modified configuration difficult and any acceptable solution quite unobvious. As one example, users have become accustomed to convenient ODD access through the real estate along the side edges of the portable computer housing. Any reconfiguration of the ODD user interface must therefore not be unintuitive or counter-intuitive.

One possible solution is to configure and arrange disk drives in portable computers and other portable devices with access through the bottoms thereof, for insertion and removal of the disk media into and out of the ODDs. Unfortunately, this can require access doors for the ODD that may be vulnerable to damage when open, and that must be overly large in order to enable users to reach into the device to grasp and remove the disk.

It has been unexpectedly discovered, as taught herein, that bottom-access ODD configurations can be successfully and economically implemented with highly intuitive interfaces and access elements that are decidedly efficacious and convenient for the user.

Referring now to FIG. 1, therein is shown a portable computer 100 having a display 102 mounted on a hinge to a housing base 104. A keyboard 106 is located on the top surface of the housing base 104. An ODD 108 is mounted within the housing base 104 adjacent the bottom surface 110 thereof. The perimeter edge surfaces of the housing base 104 include the front edge 112, the right edge 114, the left edge (not shown), and the rear edge (not shown) of the housing base 104. Based upon this disclosure, it will also be understood and will be clear to one of ordinary skill in the art that the term "perimeter edge surfaces" is thus not restricted to one or more surfaces having a particular height, and may also refer to and include a perimeter line or edge of zero height, such as would obtain if the portable device had a shape, for example, akin to a "flying saucer".

The portable computer 100 also contains a mobile motion module ("MMM") 116 that is a triaxial gravitational force ("g-force") detector. In use, the MMM 116 provides important protection for the portable computer 100 by detecting dangerous force-related events such as dropping of the computer. Upon detecting such an event, for example, the MMM 116 can then instruct the hard drive (not shown) and the ODD 108 of the portable computer 100 to park the drive heads to protect against damage upon subsequent impact. The MMM 116 also contains circuitry that continuously reports information concerning the physical orientation of the portable computer 100.

Figure 2:
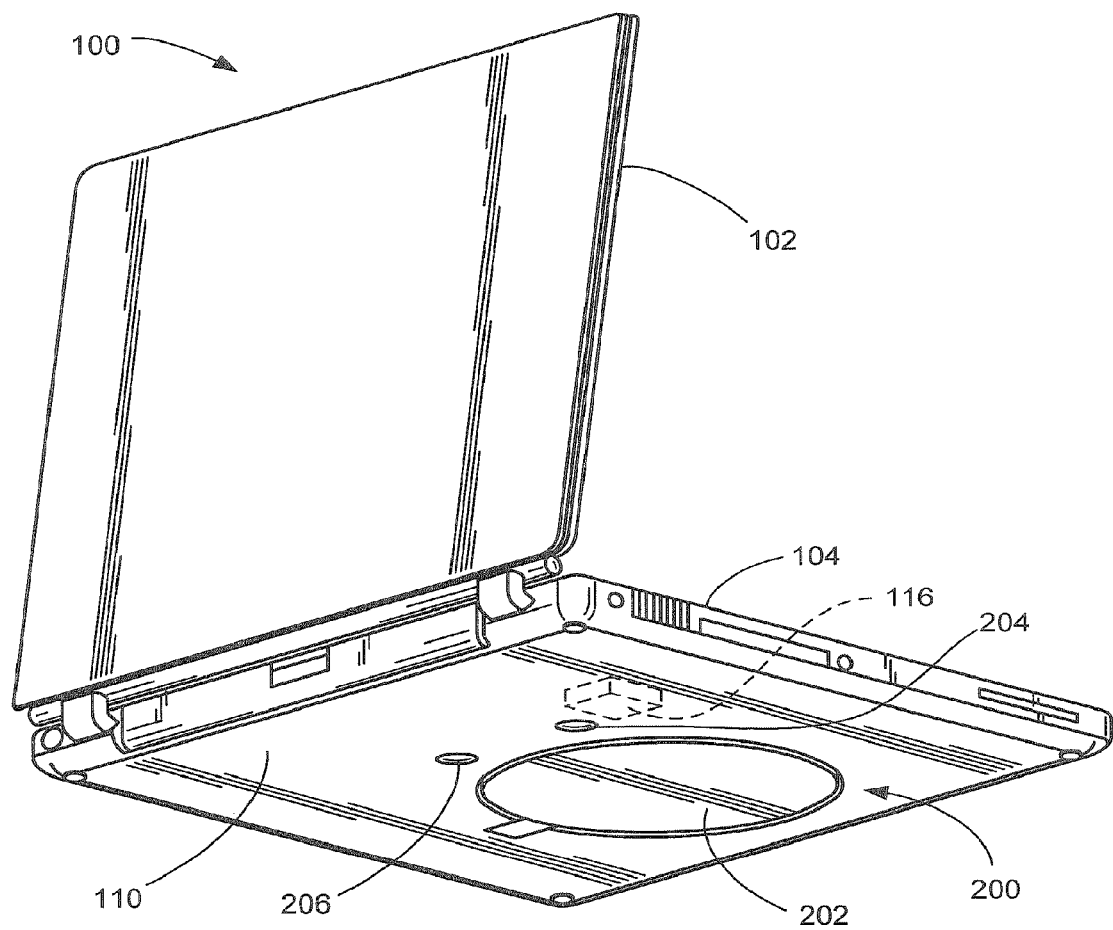
FIG. 2 is a bottom view of the structure of FIG. 1.

Referring now to FIG. 2, therein is shown a bottom view of the portable computer 100 of FIG. 1. It has been unexpectedly discovered that particularly convenient access to the ODD 108 can be provided by an active user interface 200 that is located on the bottom surface 110 of the housing base 104. Heretofore, the bottom of a portable computer has not been utilized for such active user interface access. Instead, only passive interface utilization has been made, such as the provision of ventilation openings, of access doors for batteries, of connectors for external cables, and so forth. But the user has not actively interacted in this manner with the computer through interfaces on the bottom of such portable computers. Rather, such active user interfaces have been just on the top surface and on the side or perimeter edge surfaces of the portable computer.

As thus used herein, therefore, the term active user interface means that the user directly contacts and manipulates the computer during computer use and operation. In one embodiment, such as that illustrated in FIG. 2, the portable computer 100 is then inverted (see, for example, FIGS. 3 and 4) during active use to utilize the bottom surface 110 of the portable computer 100 as a bottom-located active user interface 200. In the embodiments illustrated and described herein, for example, the active user interface 200 includes the access that is provided for the bottom-mounted ODD 108 (FIG. 1).

Figure 3:
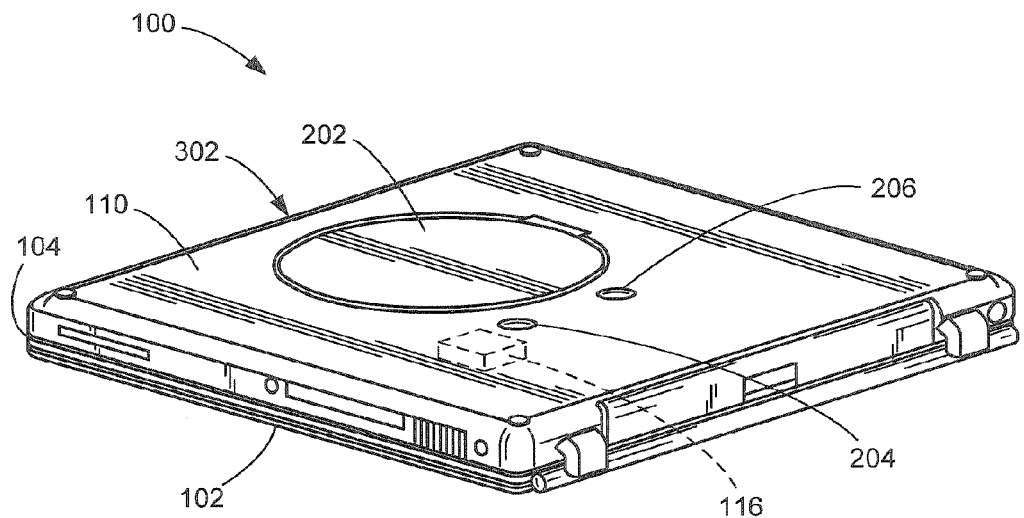
FIG. 3 is a view of the structures of FIGS. 1 and 2 with the display closed and the portable computer inverted.
Figure 4:
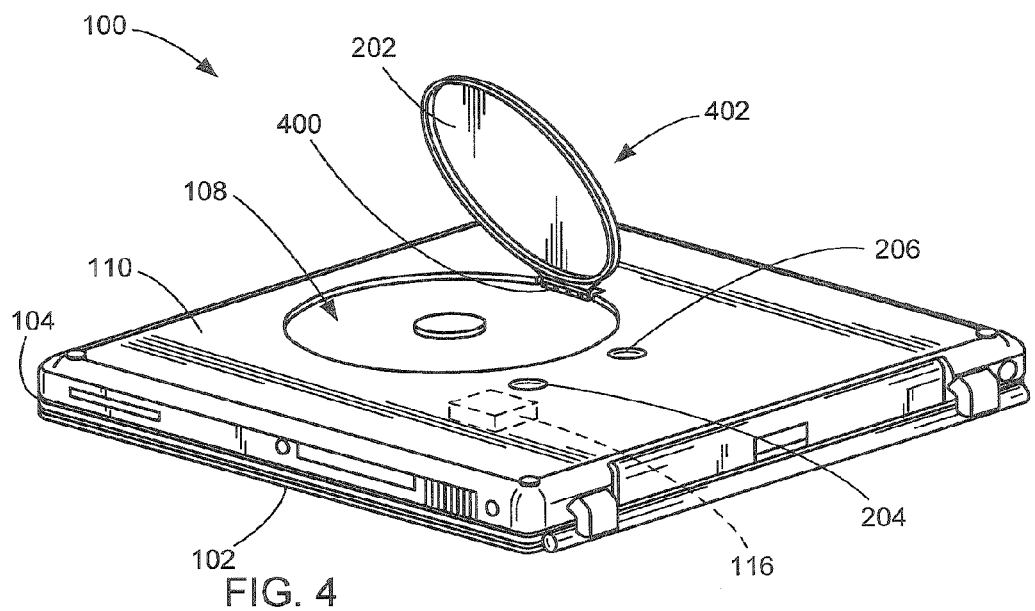
FIG. 4 is a view similar to that of FIG. 3 with the door open and providing access to the optical disk drive.

Thus, the active user interface 200 that is located on the bottom surface 110 of the housing base 104 is a media access door such as a door 202 for the ODD 108 (not shown, but see FIG. 4). The door 202 is shown in its closed position 302 (see FIG. 3), thus covering the ODD 108.

Adjacent the door 202 is an actuation button 204 and an indicator light 206. The actuation button 204 may be, for example, a capacitative sensor for user contact to initiate opening of the door 202. The indicator light 206 may illuminate (e.g., blink) to provide a warning that the door 202 is about to open. Thus, the actuation button 204 and the indicator light 206 provide additional forms of active user interfaces on the bottom surface 110 of the portable computer 100 that can be utilized, for example, when the portable computer 100 is oriented upside down (as shown in FIGS. 3 and 4). Based upon this disclosure it will also now be clear to one of ordinary skill in the art that the actuation button 204 and the indicator light 206 may be utilized to perform other active user interface functions, and that additional such bottom surface active user interface buttons and indicators may be provided, jointly and/or severally, for other desired active user functions as well.

In order to keep the surface of the bottom surface 110 of the portable computer 100 smooth, the actuation button 204 and the indicator light 206 may each be mounted flush on the bottom surface 110.

Referring now to FIG. 3, therein is shown the portable computer 100 of FIGS. 1 and 2, in which the display 102 has been closed and the portable computer 100 inverted. The door 202 of the portable computer 100 is shown in a closed position 302.

Referring now to FIG. 4, therein is shown a view of the portable computer 100, similar to that of FIG. 3, in which the door 202 has been pivoted on a break-away hinge 400 to an open position 402 to provide access therethrough to the ODD 108 therebeneath. A disk, such as a compact disk ("CD") or a digital versatile disk ("DVD"), may now be inserted or removed from the ODD 108.

The inversion of the ODD 108 facilitates an advantageously intuitive active user interface function through the bottom surface 110 of the portable computer 100. That is, the inversion of the portable computer 100, to provide access to the active user interface 200 (in this case, the door 202) on the bottom surface 110 of the portable computer 100, results in a "double inversion" of the ODD 108. As a consequence, when thus accessed by the user, the ODD 108 presents itself to the user in an apparently upright (and in fact, an actual, physically upright) position. In response, the user then correctly and naturally inserts a disk in the correct position, intuitively consistent with the user's expectations. The user interface with the ODD 108 is thus user-friendly and intuitive, and requires no special accommodation.

The door 202 is movably attached to the housing base 104 of the portable computer 100 by the break-away hinge 400. As will be described in greater detail hereinafter, the break-away hinge 400 is a very robust hinge that is designed to permit the door 202 to break away from the housing base 104 and not to be damaged when subjected to a force that would otherwise damage a conventional hinge. This behavior occurs in response to any abnormal forces on the door 202, such as an effort to open the door beyond its full open position 402, an effort to twist the door, an effort to push the door laterally along its major surface (subjecting the hinge to a twisting force on another axis) and so forth.

Figure 5:
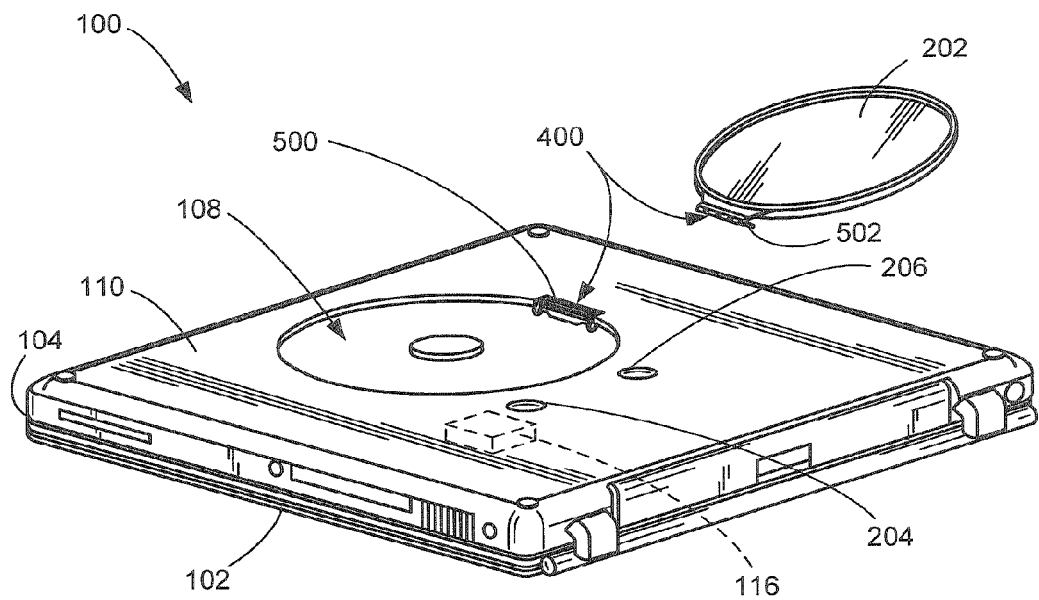
FIG. 5 is a view similar to FIG. 4 of the structure of FIG. 1 with the door broken away by utilizing the break-away hinge.

Referring now to FIG. 5, therein is shown a view similar to FIG. 4 of the portable computer 100, but with the door 202 having been released and broken away by utilizing the break-away hinge 400. The portion of the break-away hinge 400 that is attached to the housing base 104 and remains therewith is a cradle 500. The portion of the break-away hinge 400 that is attached to and remains with the door 202 is a door arm 502.

Figure 6:
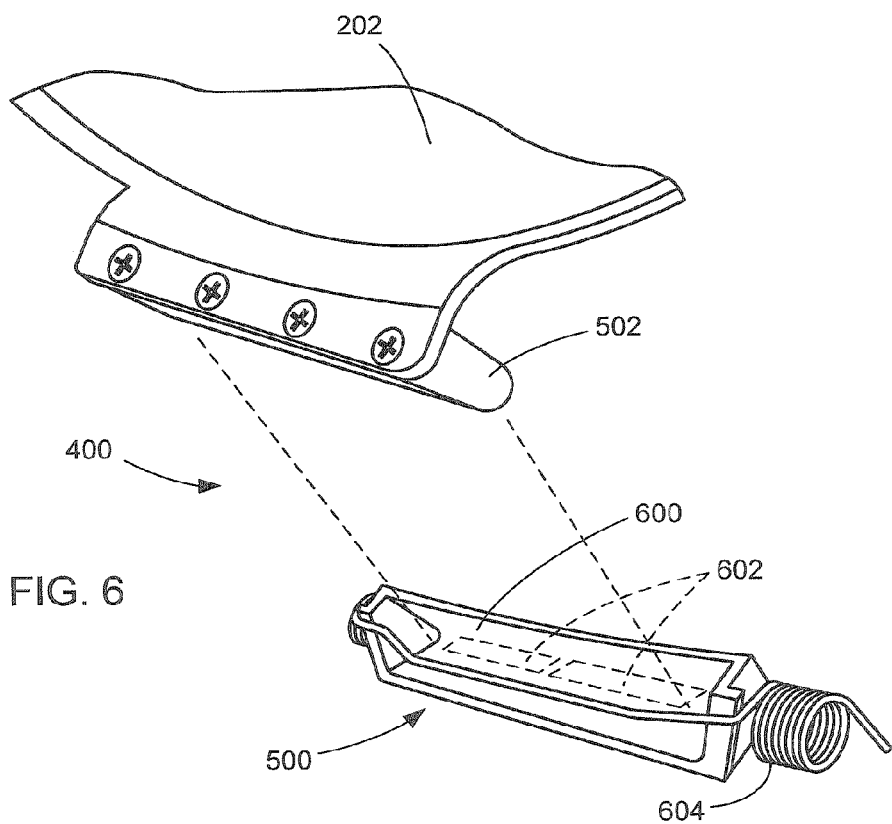
FIG. 6 is an illustrative view of the relationship between the cradle and the door arm of FIG. 5.

Referring now to FIG. 6, therein is shown a figurative, somewhat schematic illustration of the relationship between the cradle 500 and the door arm 502. The cradle 500 has a pocket 600 formed therein into which the door arm 502 is received in the normal operating configuration of the break-away hinge 400. The door arm 502 is a material of high magnetic susceptibility, such as iron or steel, and is releasably held in the pocket 600 by magnets 602 that are secured in the cradle 500 behind the pocket 600.

In one embodiment, the magnetic attraction between the door arm 502 and the magnets 602 is adjusted to secure and hold the door arm 502 in the pocket 600 during normal operation of the door 202 when it is being opened and closed. However, the force between the door arm 502 and the magnets 602 is also adjusted and calibrated to permit the door arm 502 to be forced out of and released from the pocket 600, and thus the cradle 500, when a force is applied to the door 202 that might otherwise damage the hinge 400. Under such stressful conditions, the magnetic force between the door arm 502 and the cradle 500 is broken and the door 202 is allowed simply to break away from the housing base 104 of the portable computer 100.

In one embodiment, the cradle 500 is supported on the housing base 104 by transverse axial hinges which allow the cradle 500 to pivot with movement of the door 202 between the open position 402 and the closed position 302. Opening of the door 202 is then assisted by a spring 604 that engages the cradle 500 to urge it to rotate to the open position 402 for the door 202 (as shown in FIG. 4).

Figure 7:
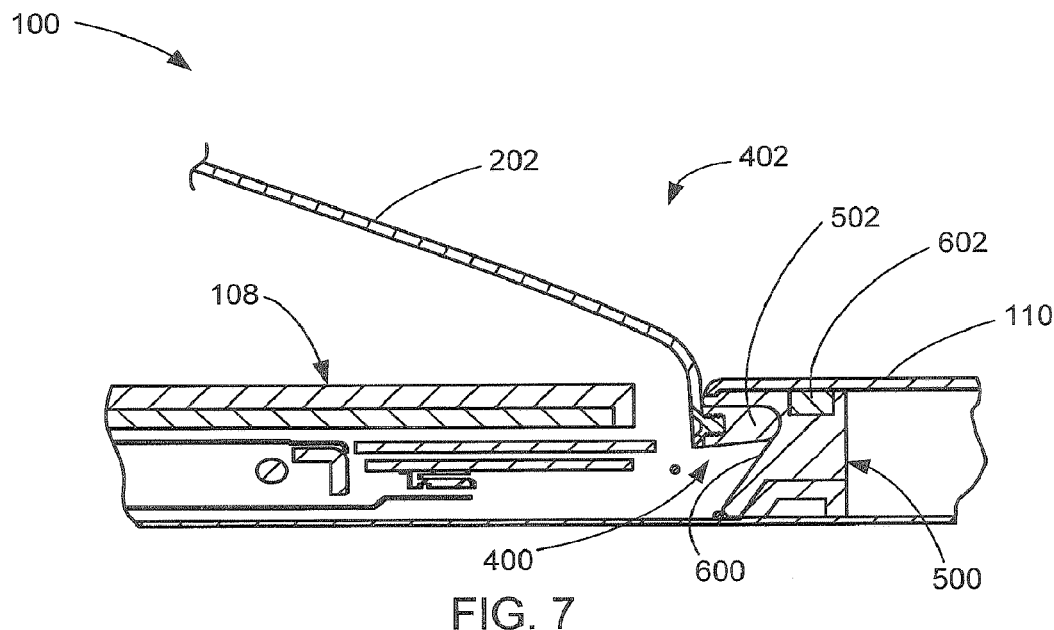
FIG. 7 is a fragmentary cross-sectional view of the structure of FIG. 1 in the vicinity of the break-away hinge.

Referring now to FIG. 7, therein is shown a fragmentary cross-sectional view of the portable computer 100 taken in the vicinity of the break-away hinge 400. The door 202 is shown in the open position 402, with the door arm 502 rotated within the pocket 600 toward and against one wall thereof. Due to the spring 604 and to the attraction between the door arm 502 and the magnets 602, the door 202 is then held and retained firmly in the open position 402.

Figure 8:
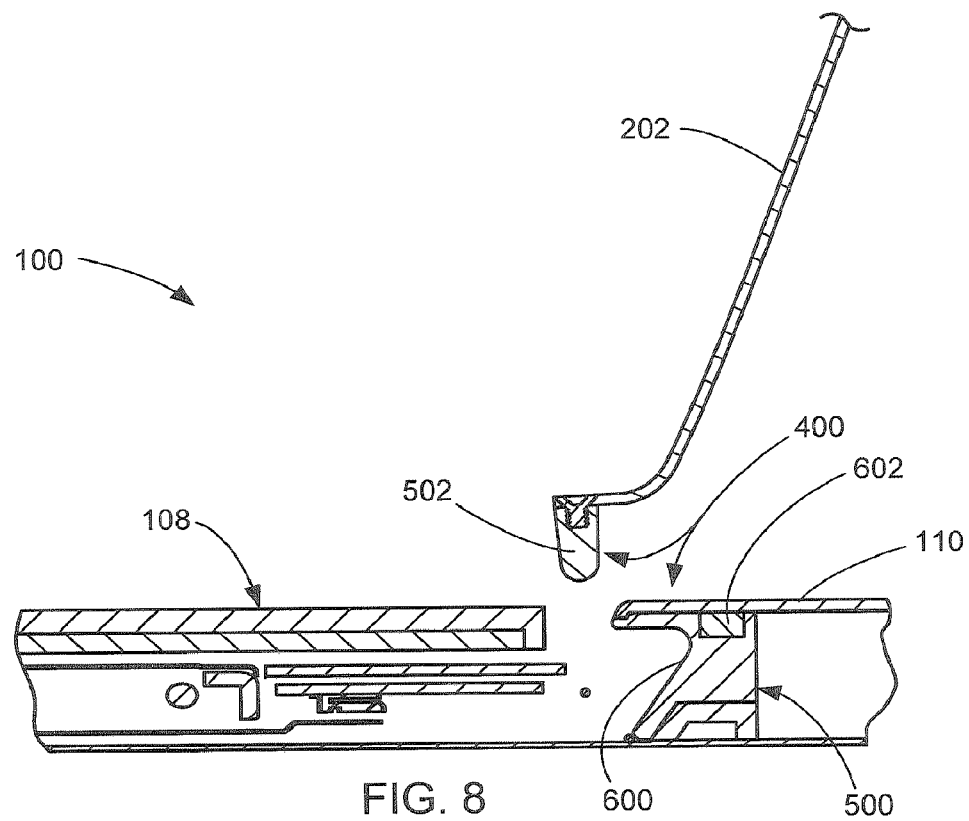
FIG. 8 is a view similar to FIG. 7 with the door forced and rotated beyond the open position.

Referring now to FIG. 8, therein is shown a view similar to FIG. 7, in which the door 202 has been forced to rotate further beyond the open position 402 (FIG. 7). Rather than causing damage to the hinge, however, the break-away hinge 400 has instead responded by prying the door arm 502 away from the magnets 602 and out of the pocket 600. The break-away hinge 400 has thereby simply released the door 202 and allowed it to break away from the housing base 104 in response to application of a set force according to the configuration of the magnets 602, the door arm 502, and the cradle 500.

It will be clear now to one of ordinary skill in the art, based on this disclosure, that normal functionality of the break-away hinge 400 is then readily and easily restored, following cessation of the applied force, by simply returning the door arm 502 to the pocket 600. Upon thus restoring the door arm 502 to the pocket 600, the magnets 602 will cause the door arm 502 to magnetically and releasably snap into position (e.g., as shown in FIG. 7), again supporting the door 202 for opening to the interior of the ODD 108 for disk media access thereto. The break-away hinge 400 thus protects against damage to the hinge for the door 202 resulting from accidental or deliberate abuse thereof.

Figure 9:
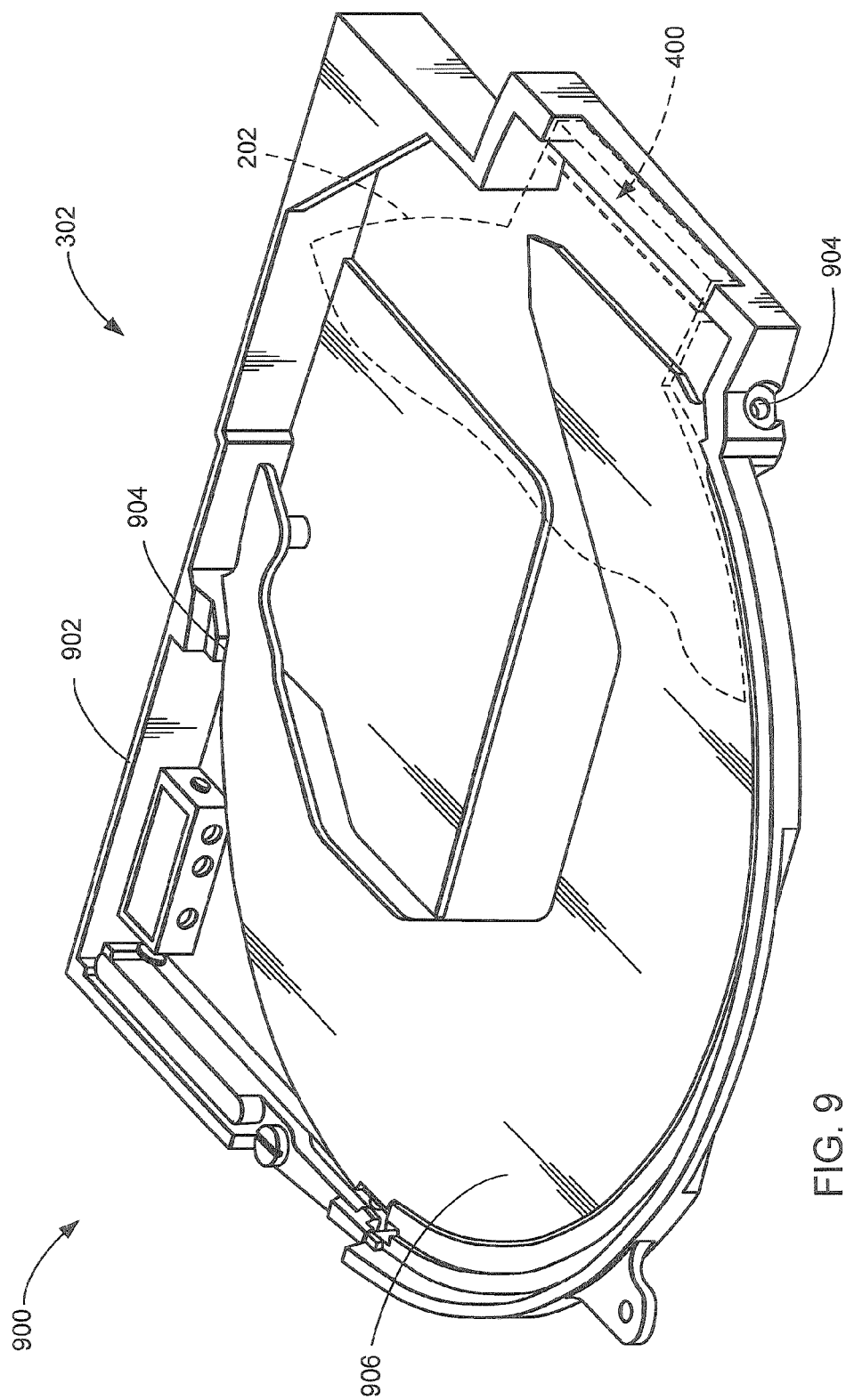
FIG. 9 is a view of a tilt tray.

Referring now to FIG. 9, therein is shown a tilt tray 900 for tilting and lifting the ODD 108 when the door 202 is moved from the closed position 302 (FIG. 3) to the open position 402 (FIG. 4). The tilt tray 900 is particularly advantageous when the door 202 is sized and configured to a dimension substantially the same or not much larger than the diameter of the disks that are received in the ODD 108.

In many situations and configurations, it is desirable for the size of the opening for the door 202 to be as small as practicable. This is particularly the case, for example, with modern portable devices where sizes are becoming ever smaller. It is also desirable because large doors present greater hazards when open and are more vulnerable to being damaged. Thus, a door, such as the door 202, that is sized approximately to the size of the disk media for the ODD 108, will present a media access door opening for insertion and ejection or removal of such disk media that is insufficient for manually engaging and removing media to and from the operational position within the ODD 108. That is, for the user to remove a disk from the ODD 108, it will be necessary for the user to be able to grasp the perimeter edge of the disk. However, the opening provided by the door 202 in the open position 402 does not provide sufficient breadth or width to enable grasping of such a disk. This is an unexpected difficulty with accessing an ODD in some manner other than utilizing side access.

It has been unexpectedly discovered that access for grasping and removing a disk (or other comparable media) can readily be provided notwithstanding that there is insufficient room for manually engaging and removing the disk directly from the ODD 108 within the housing base 104 (FIG. 4). This discovery is realized by the tilt tray 900 which, upon movement of the door 202 from the closed position 302 to the open position 402 (see FIG. 10), lifts essentially the entire ODD 108 (see FIG. 12). The ODD 108 is lifted sufficiently to position the disk (not shown, but see the disk 1108 in FIG. 12) toward, or even above, the bottom surface 110 (see FIG. 12) of the housing base 104 enough for a user to grasp the edges of the disk and remove it from the ODD 108.

The tilting of the disk 1108 permits reducing the diameter of the well that surrounds the disk because the tilt makes it unnecessary to make allowance for the user get an entire finger into the well in order to get a portion of the finder under the disk 1108. For this to occur, it is not necessary for the disk to come totally out of the plane of the bottom surface 110 of the housing base 104. It is sufficient that the disk 1108 tilts up just enough to get a finger under it. This makes it unnecessary to have a large well. Rather, by tilting the disc 1108 out of the plane of the housing base 104, the diametrical clearance requirement for a finger is effectively removed from the design For clarity of illustration of the configuration and functioning of the tilt tray 900, the ODD 108 is not shown in FIGS. 9 and 10, but it may be seen in relation to the tilt tray 900 in FIGS. 11 and 12. Therefore, and referring again to FIG. 9, the tilt tray 900 includes a yoke 902 that is secured and held in a fixed position in the housing base 104 (see FIG. 11) beneath the door 202 (see FIG. 11). Pivots 904 then pivotally support a pivot tray 906 on the yoke 902. As indicated, the ODD 108 will then be supported on and attached to the pivot tray 906 for pivoting movement around the pivots 904. A fragment of the door 202 is also shown in phantom to show the relationship between the door 202, the break-away hinge 400, and the pivots 904. The pivot tray 906 and the door 202 are in the closed position 302.

Figure 10:
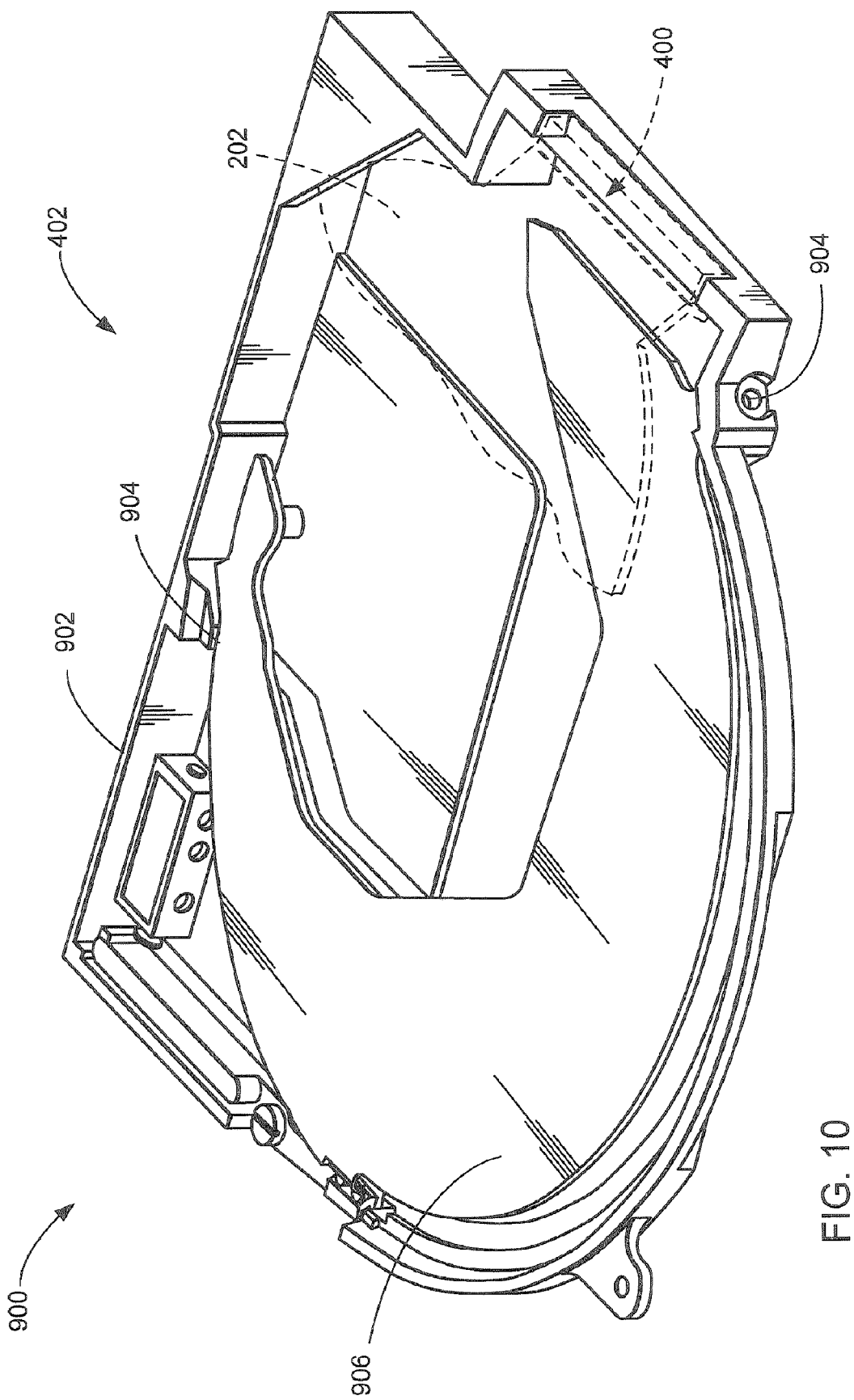
FIG. 10 is a view of the structure of FIG. 9 with the door and tilt tray in the open position.

Referring now to FIG. 10, therein is shown the structure of FIG. 9 in the open position 402. The door 202 has been pivoted to the open position 402 around the break-away hinge 400. The pivot tray 906 has rotated upwardly around the pivot 904, in response to a spring 1106 (see FIG. 12) to lift the ODD 108 (not shown, but see FIG. 12) that is supported thereon. Lifting the ODD 108 then moves a disk, such as the disk 1108 (not shown, but see FIG. 12), when engaged on the ODD 108, to a position outwardly and sufficiently above the bottom surface 110 of the housing base 104 to enable a user to grasp and remove the disk 1108.

Referring now to FIG. 11, therein is shown a figurative, fragmentary cross-sectional view of a portion of the housing base 104 in the closed position 302. The door 202 is held in the closed position 302 by a latch 1102 that engages in a slot 1104 in the door 202. The lid 202 engages and presses downwardly on the edge of the pivot tray 906, holding it in the same lowered, operational position that is illustrated in FIG. 9. A spring 1106 is compressed beneath the pivot tray 906 by force from the closed door 202. A disk 1108, such as an optical data disc media, is mounted on the ODD 108.

Referring now to FIG. 12, therein is shown a view similar to FIG. 11 following release of the latch 1102. The door 202 (not shown) has been raised by the spring 604 (FIG. 6) to the open position 402. The spring 1102 has reacted between the yoke 902 and the pivot tray 906 to raise the pivot tray 906 and the ODD 108 to the open position 402, corresponding to the position illustrated in FIG. 10.

Figure 13:
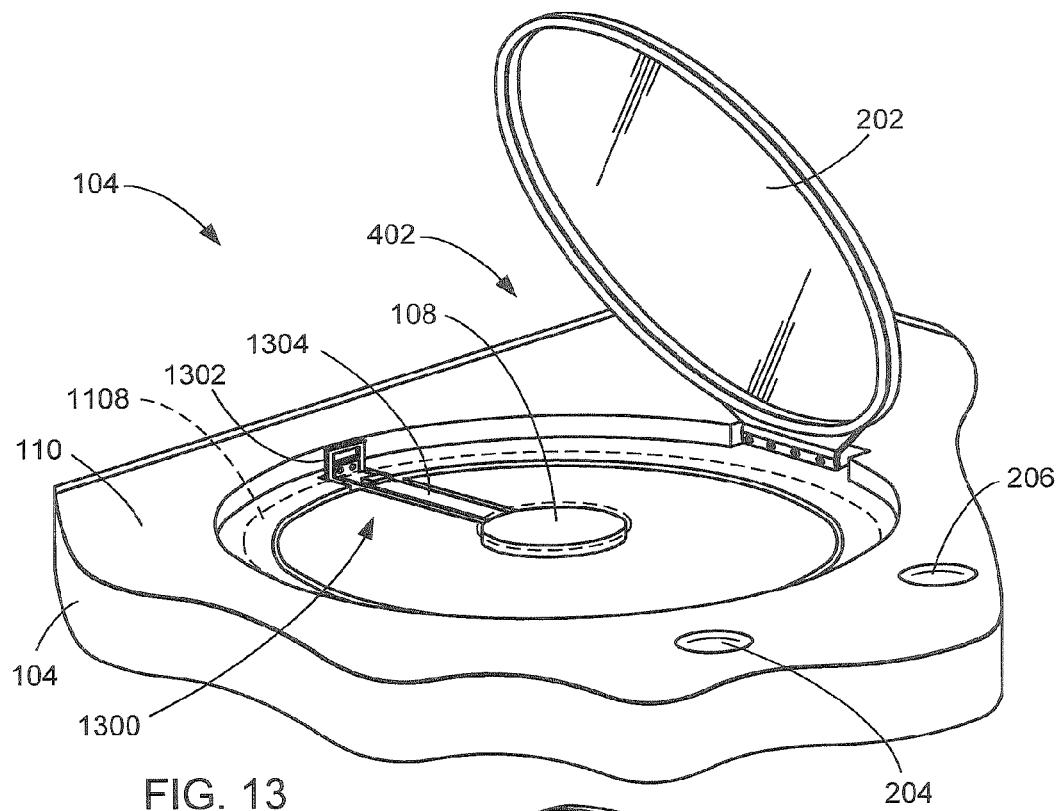
FIG. 13 is a figurative, fragmentary view of a portion of a housing base with a ribbon pull tab.

Referring now to FIG. 13, therein is shown a figurative, fragmentary view of a portion of the housing base 104 provided with a ribbon pull tab 1300 for engaging and moving the disk 1108 away and outwardly from the ODD 108 when the door 202 is in the open position 402. The ribbon pull tab 1300 includes a tab 1302 positioned just outside the rim of the disk 1108 and connected to a ribbon 1304 that extends beneath the disk 1108 inwardly toward the center of the ODD 108. In one embodiment, the tab 1302 is an open tab that can easily be engaged by slipping a finger thereinto or grasping it between two fingers or between a finger and a thumb.

Figure 14:
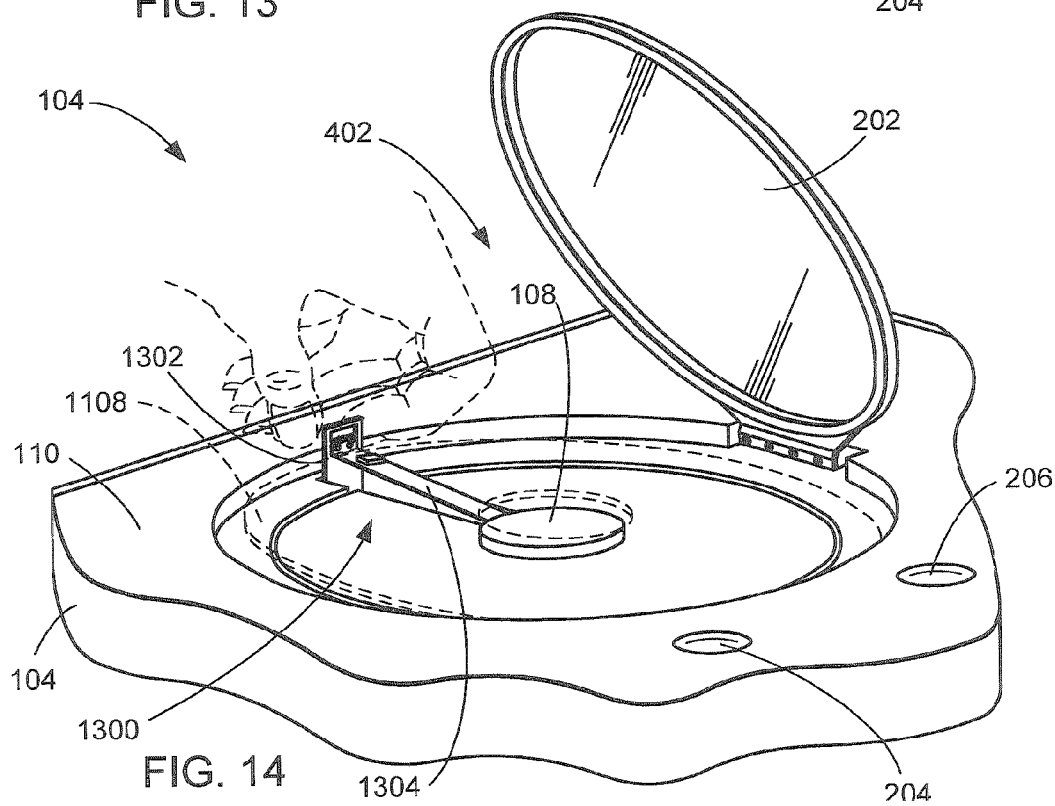
FIG. 14 is a view of the structure of FIG. 13 during removal of a disk.

Referring now to FIG. 14, therein is shown the structure of FIG. 13 during removal of the disk 1108 by grasping the tab 1302 and lifting it outwardly through the opening for the ODD 108. Lifting the tab 1302 in this manner raises the ribbon 1304 beneath the disk 1108, thereby also lifting the disk 1108 so that it can be readily grasped and removed by the user. That is, the disk media (the disk 1108) is engaged with the ribbon pull tab 1300 located therebeneath and moved toward the media access door (the door 202), toward and into the opening beneath the door 202, by moving the ribbon pull tab 1300 outwardly toward the door 202 and into the door opening between the door and the ODD 108.

Figure 15:
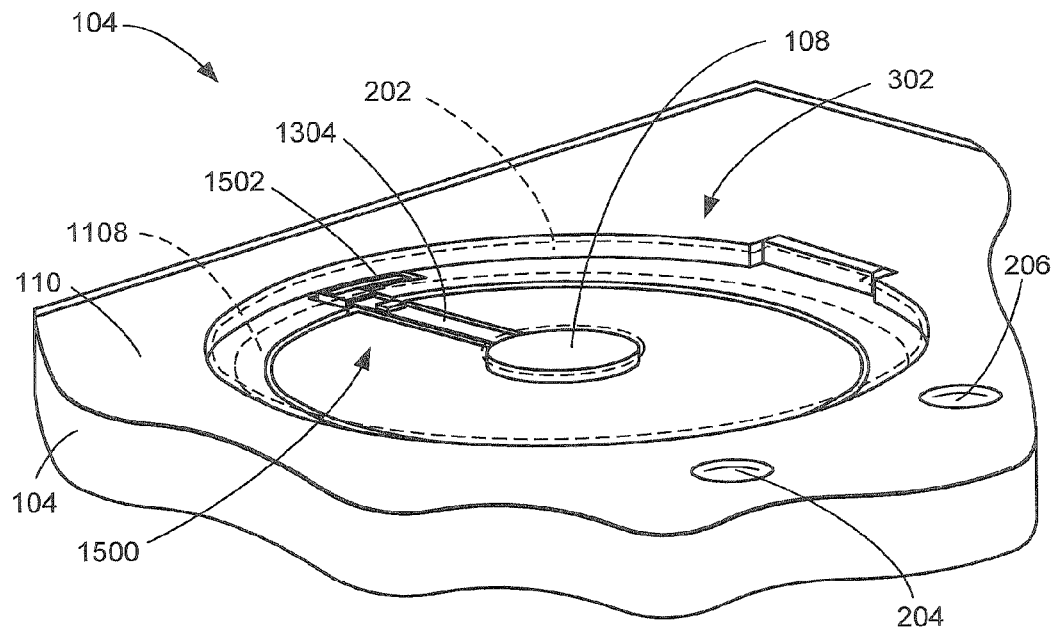
FIG. 15 is a figurative, fragmentary view of a portion of a housing base with another embodiment of a ribbon pull tab.

Referring now to FIG. 15, therein is shown a figurative, fragmentary view of a portion of the housing base 104 provided with another embodiment of a ribbon pull tab. The embodiment of FIG. 15 includes a ribbon pull tab 1500 that has a tab 1502 that is a pop-up tab connected to the ribbon 1304. In the closed position 302, the door 202 holds the tab 1502 in a depressed position just beyond the rim of the disk 1108.

Figure 16:
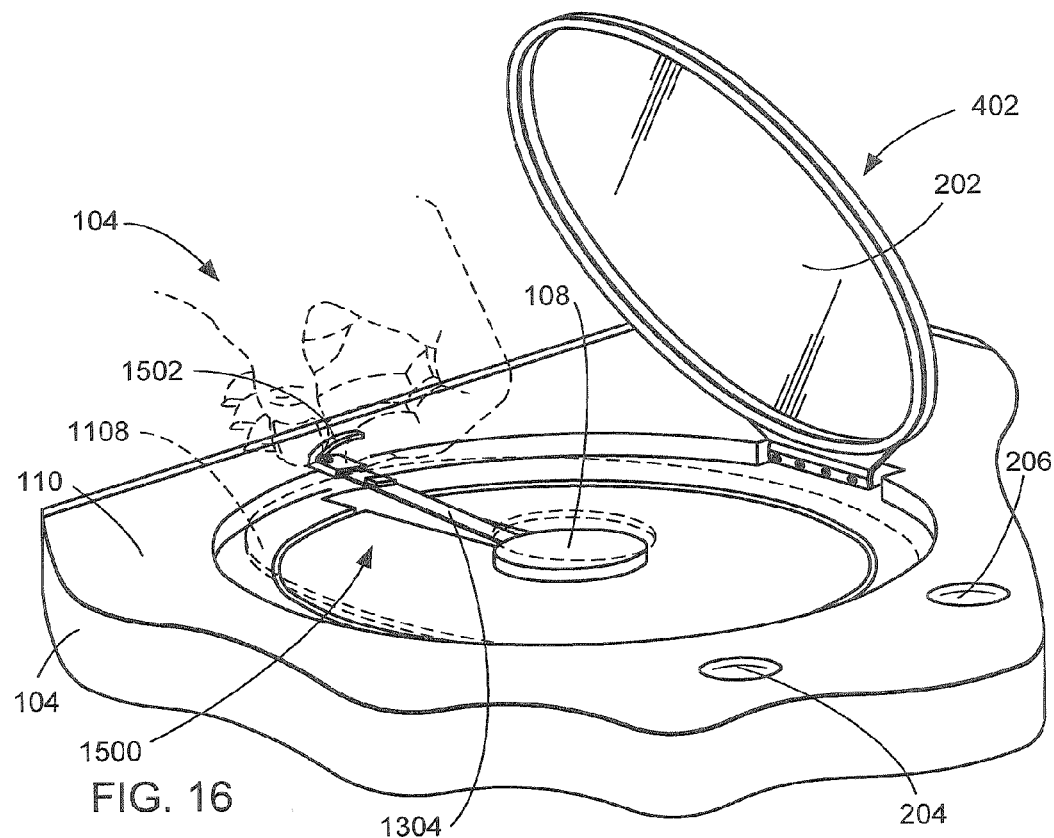
FIG. 16 is a view of the structure of FIG. 15 during removal of a disk.

Referring now to FIG. 16, therein is shown the structure of FIG. 15 in which the door 202 has been moved to the open position 402. The door 202 has released the tab 1502 which has then sprung up to be readily engaged by the user for lifting the ribbon 1304 for removing the disk 1108 from the ODD 108. In one embodiment, the tab 1502 is made of plastic which has a rest profile in the popped-up configuration, and is deformed to a compressed or retracted position, as shown in FIG. 15, when the door 202 is in the closed position 302. In another embodiment, the tab 1502 may be formed of a springy metallic material, such as memory metal, for example.

Figure 17:
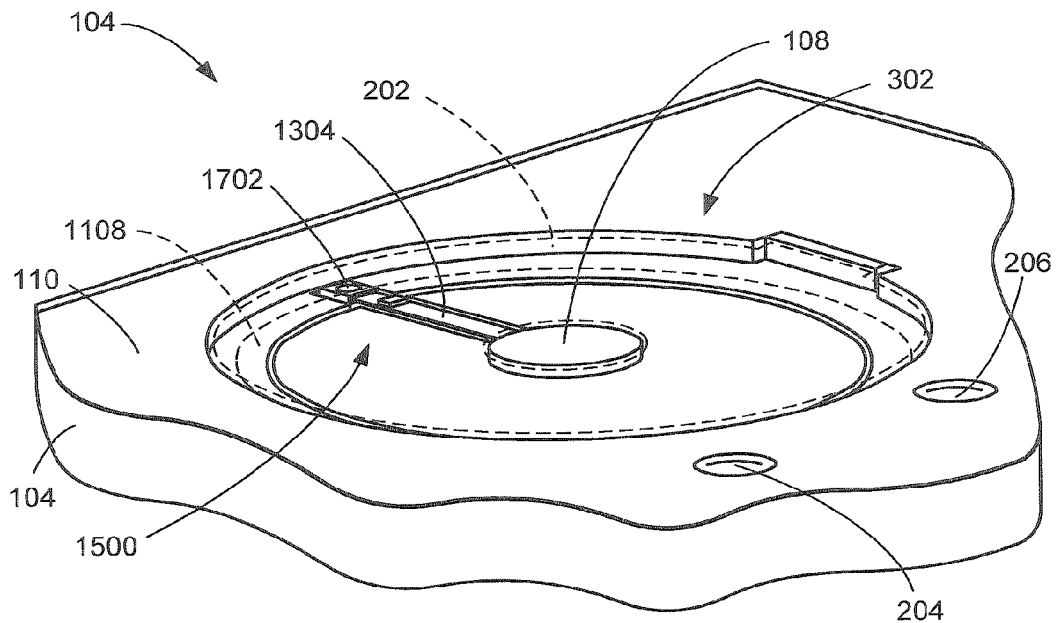
FIG. 17 is a view similar to FIG. 15 of an embodiment with a disk-removal pop-up button pushed into the housing base by the door in the closed position.

Referring now to FIG. 17, therein is shown a view similar to FIG. 15, illustrating an embodiment having a pop-up button 1702 that is pushed into the housing base 104 by the door 202 when the door 202 is in the closed position 302.

Figure 18:
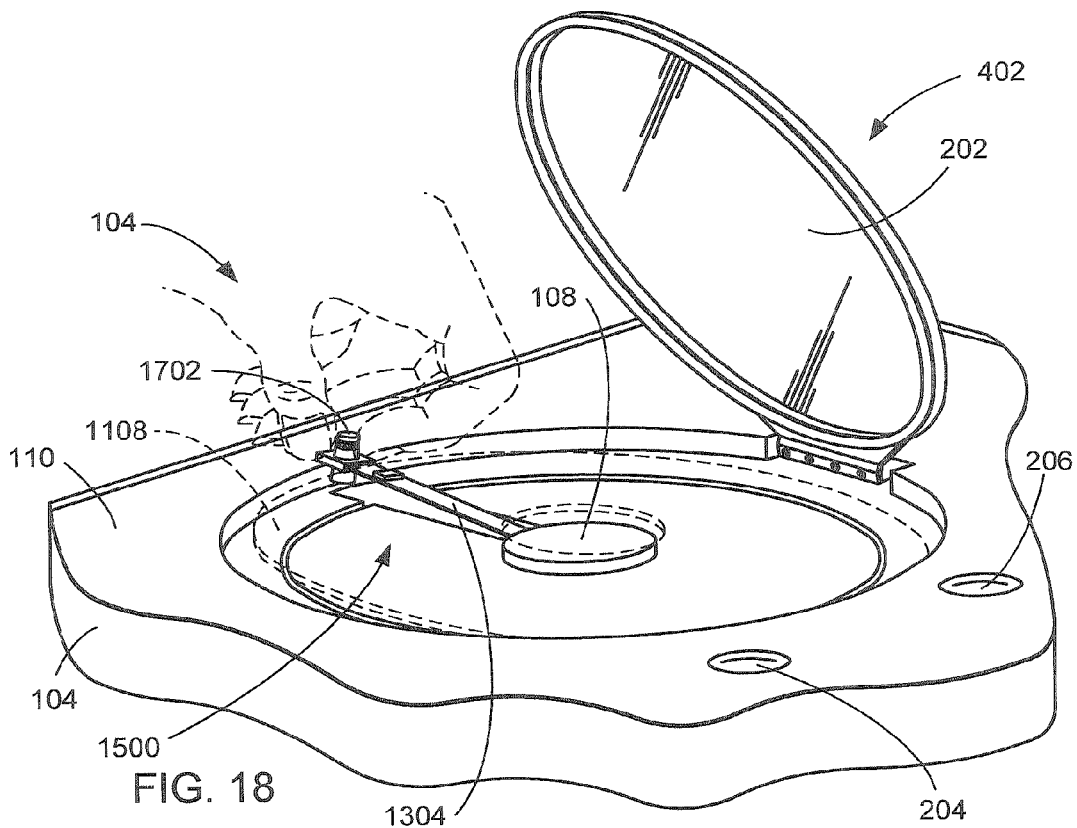
FIG. 18 is a view of the structure of FIG. 17 with the door in the open position.

Referring now to FIG. 18, therein is shown the structure of FIG. 17 following movement of the door 202 to the open position 402. The pop-up button 1702 has elevated above the ribbon 1304, upon release by the door 202, for engagement by the user and lifting thereof to lift the ribbon 1304 beneath the disk 1108 for lifting and removing the disk 1108 from the ODD 108.

Figure 19:
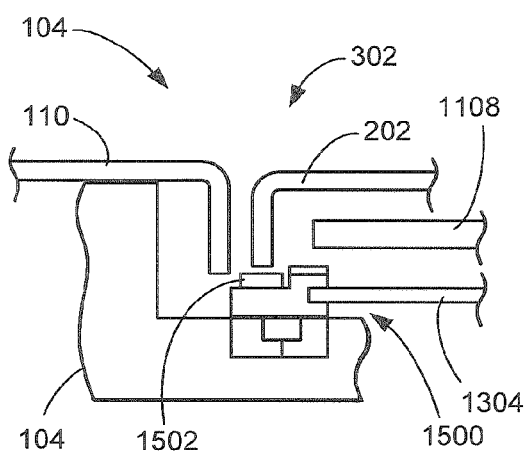
FIG. 19 is a fragmentary, cross-sectional view of the disk-removal pull tab of FIG. 15 with the door in the closed position.

Referring now to FIG. 19, therein is shown a fragmentary, cross-sectional detail of the ribbon pull tab 1500 (see FIG. 15) in the closed position 302. The door 202 is holding the tab 1502 in the down or retracted position.

Figure 20:
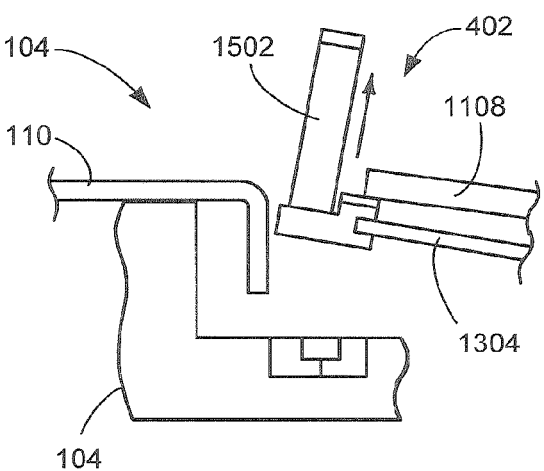
FIG. 20 is a view of the structure of FIG. 19 with the door in the open position and the tab released.

Referring now to FIG. 20, therein is shown the structure of FIG. 19 in the open position 402. The tab 1502 has been released, has sprung up, and has been engaged by the user (not shown) to be lifted upwardly and thereby lift the disk 1108 upwardly above the level of the bottom surface 110 for removal from the portable computer 100 (FIG. 1).

Figure 21:
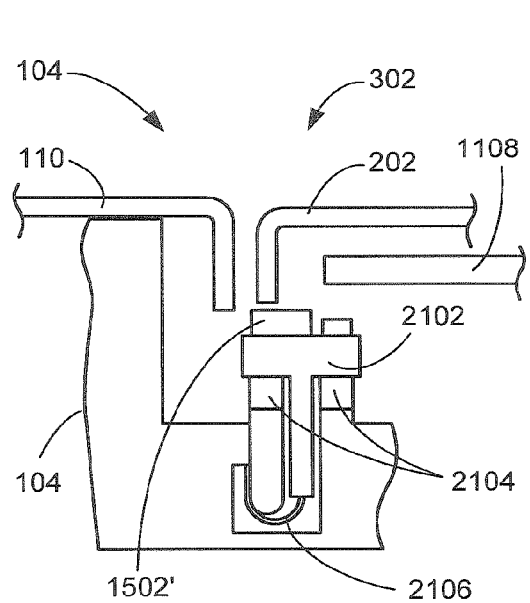
FIG. 21 is a view similar to FIG. 19 of an alternative tab embodiment, with the lid in the closed position.

Referring now to FIG. 21, therein is shown a view similar to FIG. 19 of an alternative embodiment of the tab 1502. Thus, rather than being supported and guided by the ribbon 1304, a tab 1502' is configured with a magnetic guide base 2102. In the closed position 302, the magnetic guide base 2102 is held in position by magnets 2104 and secured by a tether 2106 against loss when the disk is ejected (see FIG. 22). The tether 2106 is anchored to the housing base 104. In one embodiment, the magnetic seat (defined, for example, by the magnets 2104) may be chamfered to provide for proper stowage of the tab 1502'.

Figure 22:
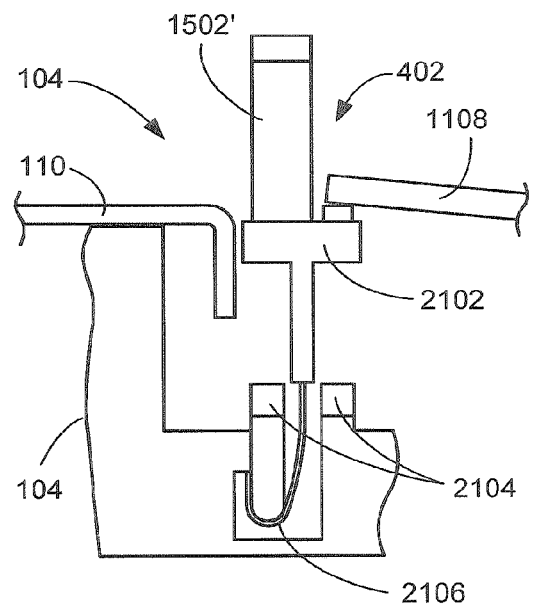
FIG. 22 is a view of the structure of FIG. 21 with the lid in the open position.

Referring now to FIG. 22, therein is shown the structure of FIG. 21 following movement of the lid 202 (FIG. 21) to the open position 402. The tab 1502' has been pulled up by the user, breaking the magnetic retention force of the magnets 2104 and popping the disk 1108 free from the ODD 108 (FIG. 15) for removal.

In some embodiments, the tab 1502 (FIG. 15) and the pop-up button 1702 (FIG. 17) may be captured and guided, for example, by guide pins or other mechanical configurations (e.g., channels) to assist with the proper up and down motion and to retain them in their proper locations. The tab 1502' (FIGS. 21 and 22), by virtue of the magnetic force acting between the magnetic guide base 2102 and the magnets 2104, and by virtue of the safety feature of the tether 2106, is not so limited in vertical movement as compared with a guided tab or guided pop-up button.

Figure 23:
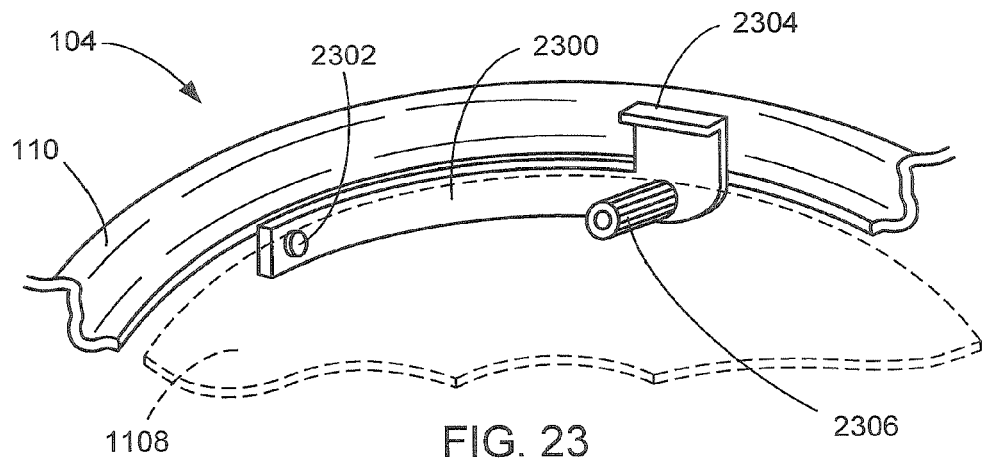
FIG. 23 is a figurative, fragmentary view of a portion of a housing base with an eject lever and a disk-engaging wheel.

Referring now to FIG. 23, therein is shown a figurative, fragmentary view of a portion of the housing base 104 of the portable computer 100 (FIG. 1) incorporating an eject lever 2300 for removal of the disk 1108. The eject lever 2300 is pivoted for vertical rotational movement around a pivot 2302 upon being engaged when the user grasps a tab finger grip 2304 and moves the eject lever upwardly or downwardly accordingly. Thus, once the door 202 (not shown) is opened, the user simply pulls up on the tab finger grip 2304 to cause a wheel 2306 to engage beneath the disk 1108 and press the disk 1108 up and out of the portable computer 100.

The wheel 2306, which in one embodiment may be formed of compliant rubber, may be configured to rotate with modest resistance, so that if the disk 1108 is still rotating when engaged by the wheel 2306, the wheel will remove or take the remaining energy out of the spinning disk 1108 without scratching or damaging the disk 1108.

Figure 24:
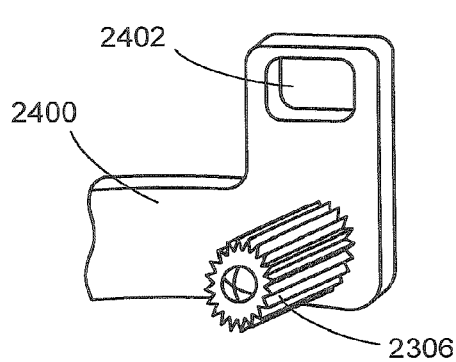
FIG. 24 is a view of an eject lever similar to that of FIG. 23 with an open finger grip.

Referring now to FIG. 24, therein is shown an eject lever 2400 similar to the eject lever 2300 (FIG. 23), except that the eject lever 2400 is provided with an open finger grip 2402 rather than the tab finger grip 2304 (FIG. 23).

Figure 25:
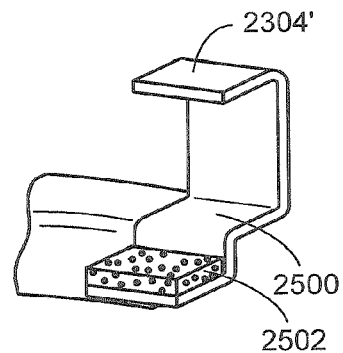
FIG. 25 is a view of an eject lever with a tab finger grip and a disk-engaging pad.

Referring now to FIG. 25, therein is shown an eject lever 2500 having a tab finger grip 2304' and a pad 2502. The pad 2502 is positioned beneath the disk 1108 (FIG. 23), and in one embodiment is formed of felt, to provide a breaking action similar to the wheel 2306 (FIG. 23) without damaging a disk 1108 that may still be turning when engaged by the pad 2502.

Figure 26:
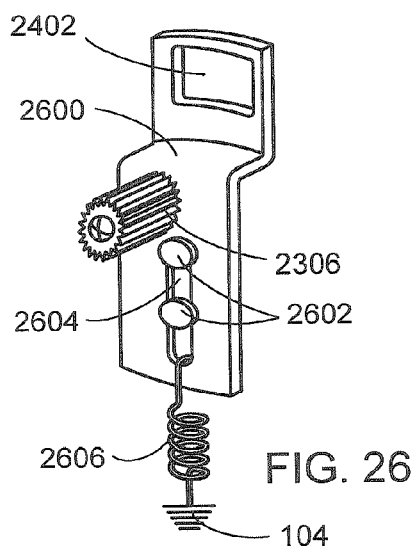
FIG. 26 is a view of an eject lever with an open finger grip and a disk-engaging wheel.

Referring now to FIG. 26, therein is shown an eject lever 2600 having an open finger grip 2402 and a wheel 2306. The eject lever 2600 is captured and guided for vertical movement by pins 2602 that pass through a channel 2604 in the eject lever 2600. A spring 2606 may be connected between the eject lever 2600 and the housing base 104 to assist in retracting the eject lever 2600 back thereinto. Actuation of the eject lever 2600 then moves the disk 1108 (not shown) toward the door 202 and the opening therebeneath by moving the eject lever 2600 along the channel 2604 and outwardly toward the door 202.

Figure 27:
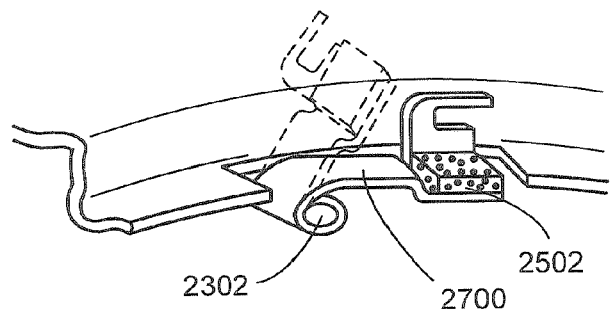
FIG. 27 is a view of a pivoted eject lever and a disk-engaging pad.

Referring now to FIG. 27, therein is shown a pivoted eject lever 2700 that is captured by and rotates around a pivot 2302 to bring a pad 2502 against the underside of the disk 1108 (not shown) for removal thereof from the ODD 108 (not shown).

Figure 28:
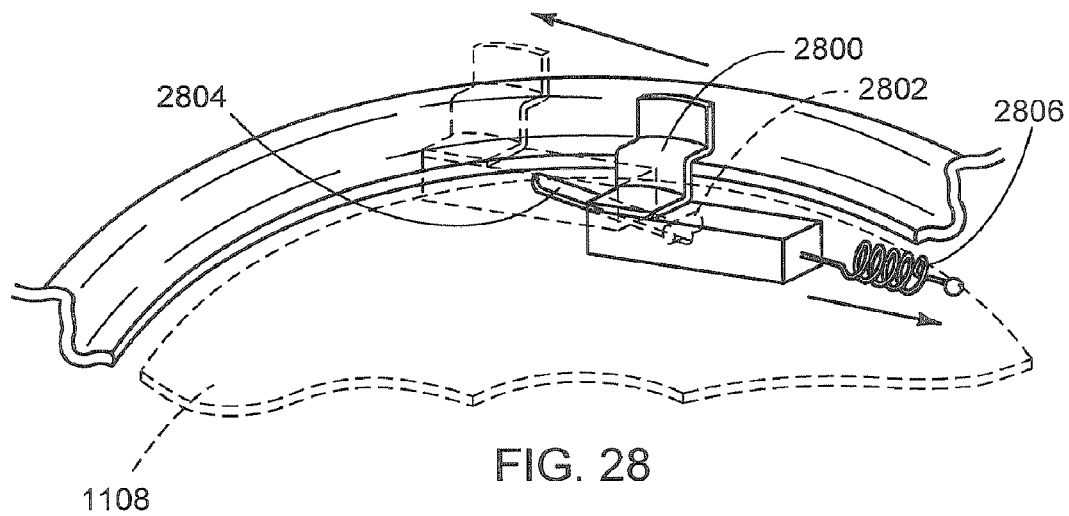
FIG. 28 is a view of a shuttle eject lever that operates as a ramp cam disk eject.

Referring now to FIG. 28, therein is shown a shuttle eject lever 2800 that operates as a ramp cam disk eject. The shuttle eject lever 2800 has a pin 2802 that is captured in and guided by a ramp 2804 to cam the shuttle eject lever 2800 upwardly, as it is rotated along the axis of rotation of the disk 1108, to eject the disk. A spring 2806 may assist in returning the shuttle eject lever 2800. Actuation of the shuttle eject lever 2800 then moves the disk 1108 (not shown) toward the door 202 and the opening therebeneath by moving the shuttle eject lever 2800 along the ramp 2804 and outwardly toward the door 202.

Figure 29:
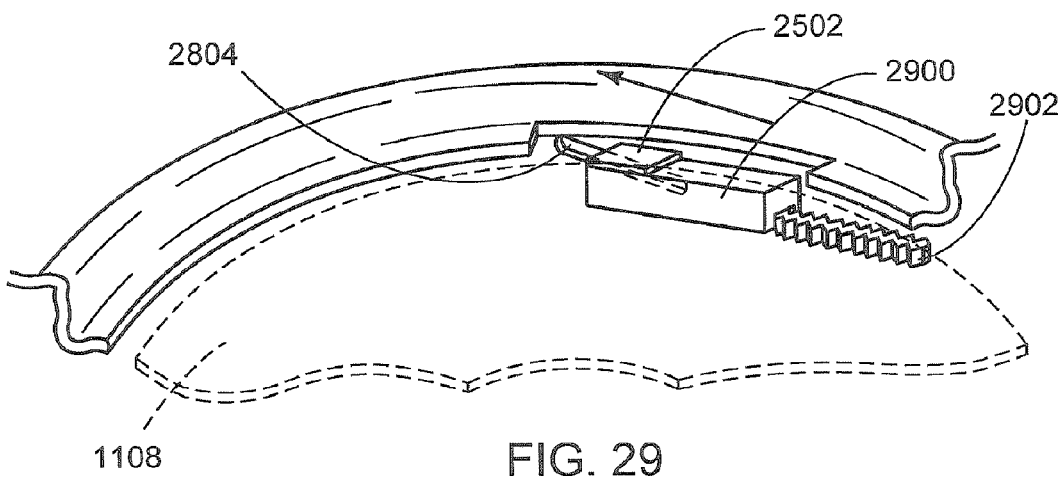
FIG. 29 is a view of an internally actuated shuttle eject operating as a ramp cam disk eject.

Referring now to FIG. 29, therein is shown a shuttle eject 2900 operating as a ramp cam disk eject guided by the ramp 2804 and internally actuated by an actuator 2902.

Figure 30:
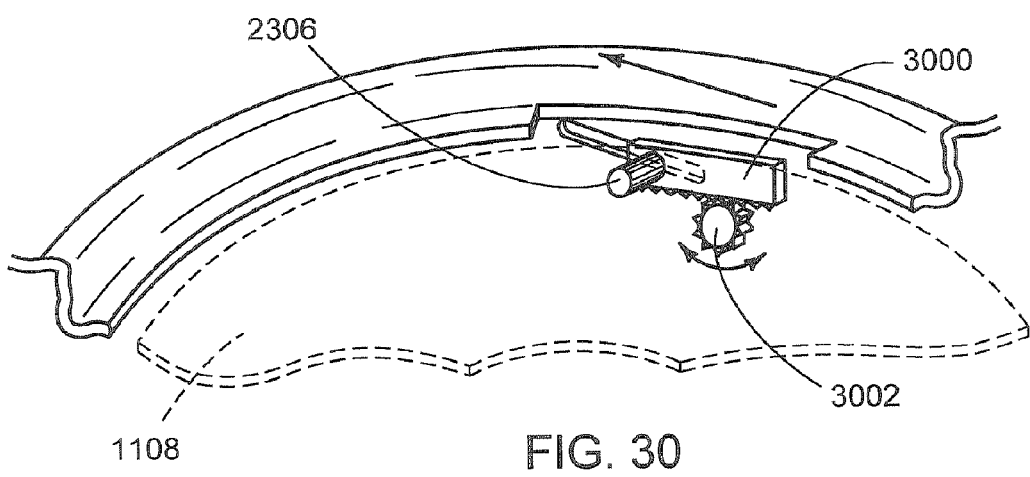
FIG. 30 is a view of another embodiment of an internally actuated shuttle eject operating as a ramp cam disk eject.

Referring now to FIG. 30, therein is shown another embodiment of an internally actuated shuttle eject 3000 operating as a ramp cam disk eject guided by the ramp 2804 and internally actuated by an actuator 3002.

Figure 31:
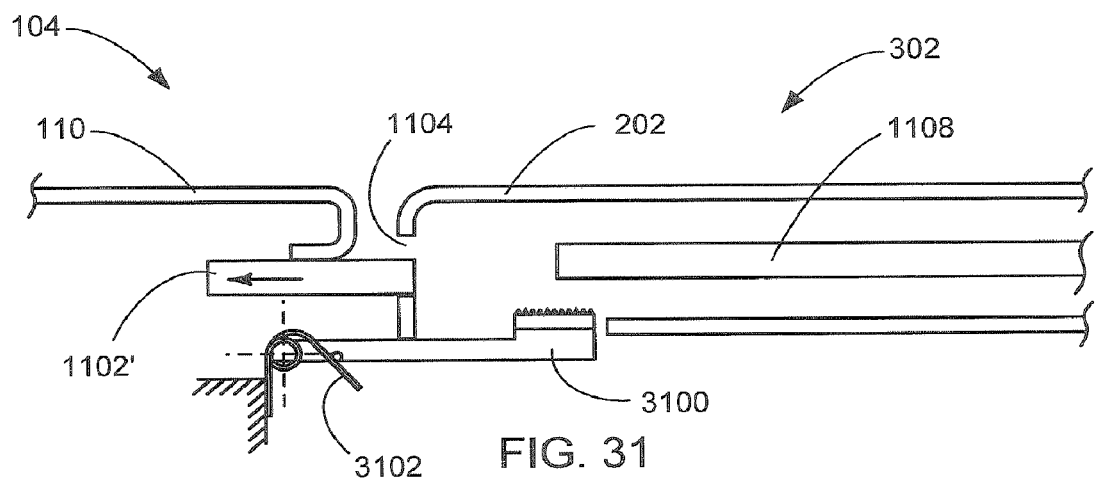
FIG. 31 is a view of a piano key eject lever.

Referring now to FIG. 31, therein is shown a piano key eject lever 3100 that is biased outwardly by a spring 3102. In the closed position 302, the door 202 presses downwardly against the piano key eject lever 3100, against the force of the spring 3102, to hold the piano key eject lever 3100 within the housing base 104 and away from the disk 1108. A latch 1102' engages in the slot 1104 of the door 202 to retain the door in the closed position 302.

Figure 32:
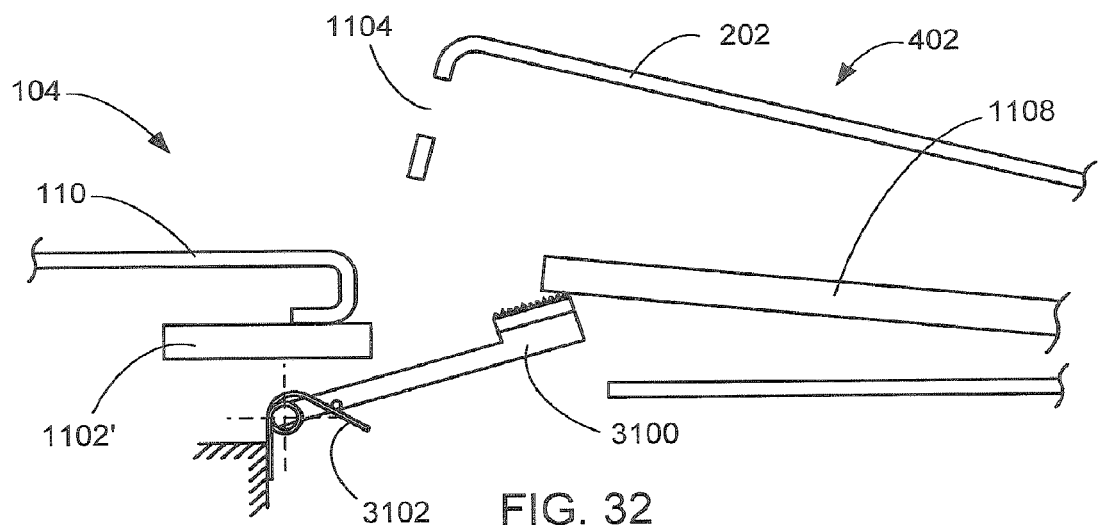
FIG. 32 is a view of the structure of FIG. 31 after retraction of a latch and release of the door to the open position.

Referring now to FIG. 32, therein is shown the structure of FIG. 31 following retraction of the latch 1102' and release, as a result, of the door 202 to the open position 402. Upon moving to the open position 402, the door 202 has also released the piano key eject lever 3100 which has been moved upwardly by the spring 3102 to raise the disk 1108 for removal. As will be appreciated, the piano key eject lever 3100 thus automatically presents the disk 1108 for removal without requiring separate and/or additional actions on the part of the user.

Figure 33:
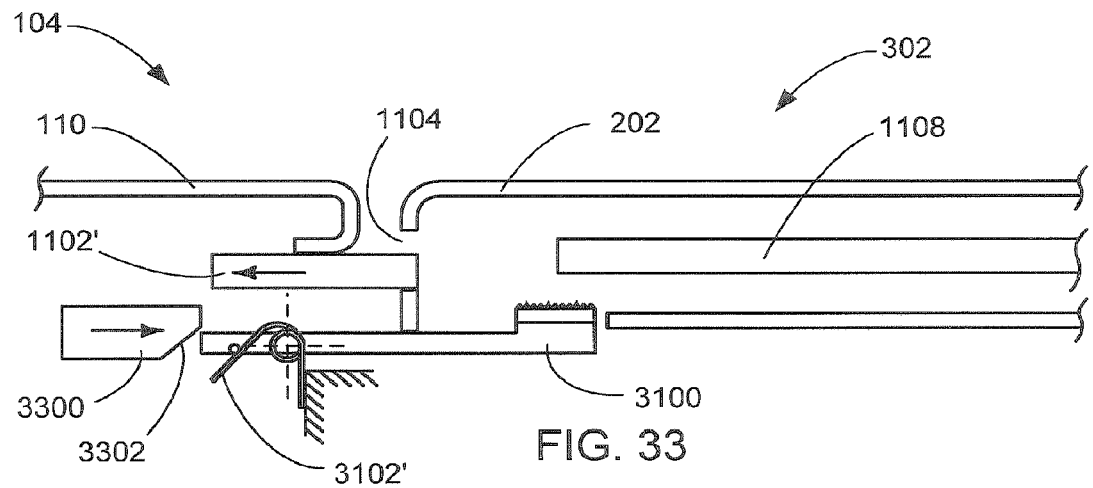
FIG. 33 is a view of a structure similar to that of FIG. 31 assisted by a key pusher.

Referring now to FIG. 33, therein is shown the structure of FIG. 31 except that the spring 3102 (FIG. 31) has been reversed to form a spring 3102' that operates to retract the piano key eject lever 3100 into the closed position 302. Also shown is a key pusher 3300. The key pusher 3300, which may be actuated for example by a solenoid (not shown), is moveable to bring a camming surface 3302 thereon against the piano key eject lever 3100 to rotate the piano key eject lever 3100 from the closed position 302 (FIG. 33) to the open position 402 (see FIG. 34). This has the advantage that the key pusher 3300 may be actuated to retract the piano key eject lever 3100 even while the door 202 is in the open position so that the piano key eject lever 3100 can be automatically retracted prior to insertion of a disk 1108 into the ODD 108 (FIG. 1), prior to closing of the door 202.

Figure 34:
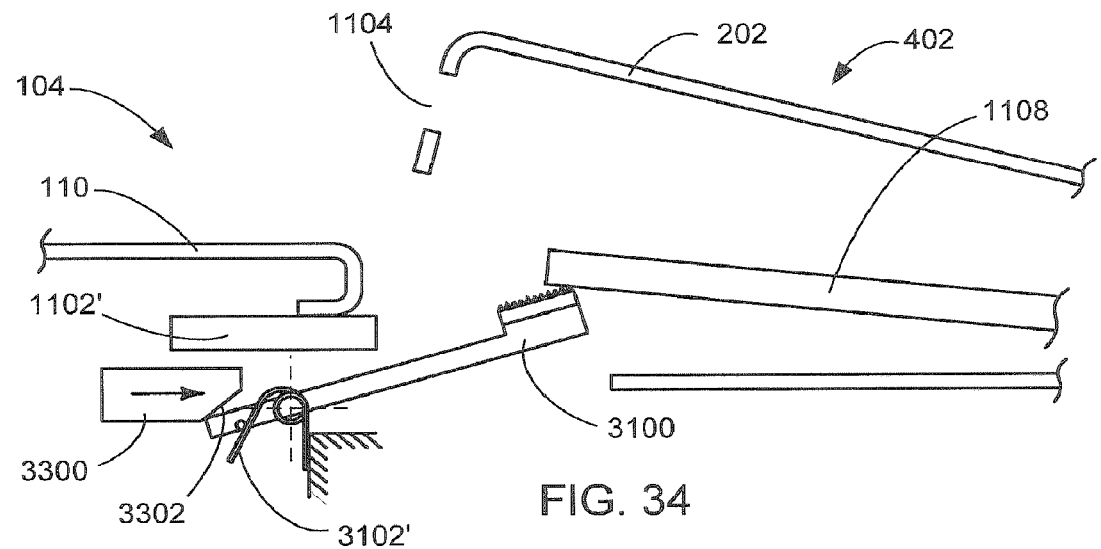
FIG. 34 is a view of the structure of FIG. 33 after opening of the door and actuation of the key pusher.

Referring now to FIG. 34, therein is shown the structure of FIG. 33 following movement from the closed position 302 (FIG. 33) to the open position 402. The key pusher 3300 has been actuated to drive the camming surface 3302 against the piano key eject lever 3100 to move the disk 1108 outwardly.

Figure 35:
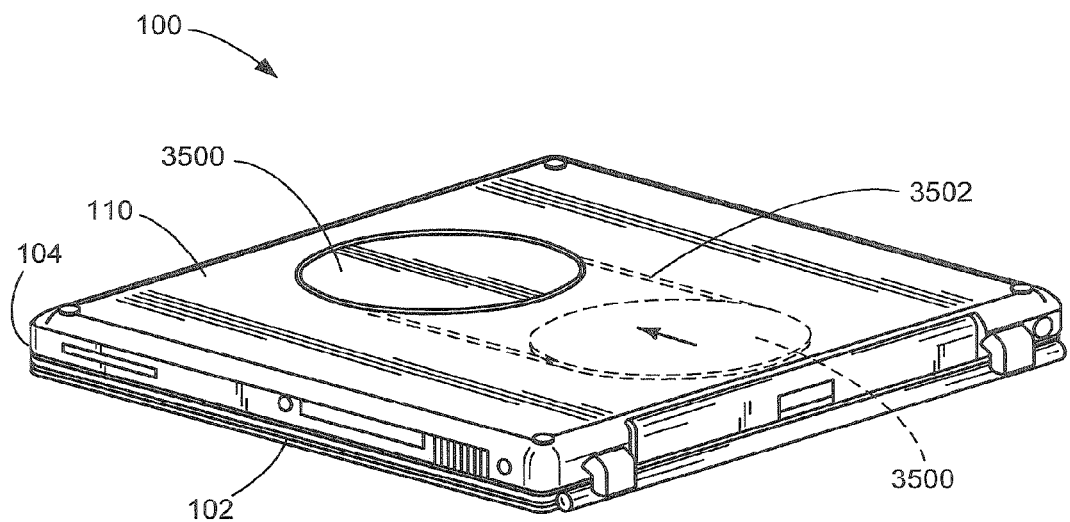
FIG. 35 is a view similar to that of FIG. 3 with a drop-and-slide door.

Referring now to FIG. 35, therein is shown a view of the portable computer 100 similar to the view shown in FIG. 3, but equipped with a drop-and-slide door 3500 rather than the door 202 (FIG. 3). The drop-and-slide door 3500 opens by dropping slightly inside the housing base 104 and traveling along a track 3502 parallel to the bottom surface 110. In this manner, the door 202 is protected because it is positioned inside the housing base 104 when in the open position. It will now also be clear to one of ordinary skill in the art upon reading this disclosure that the track 3502 of the drop-and-slide door 3500 may be configured to follow a path other than strictly linear, and the track 3502 may be configured accordingly to avoid conflicts with critical components within the housing base 104.

Figure 36:
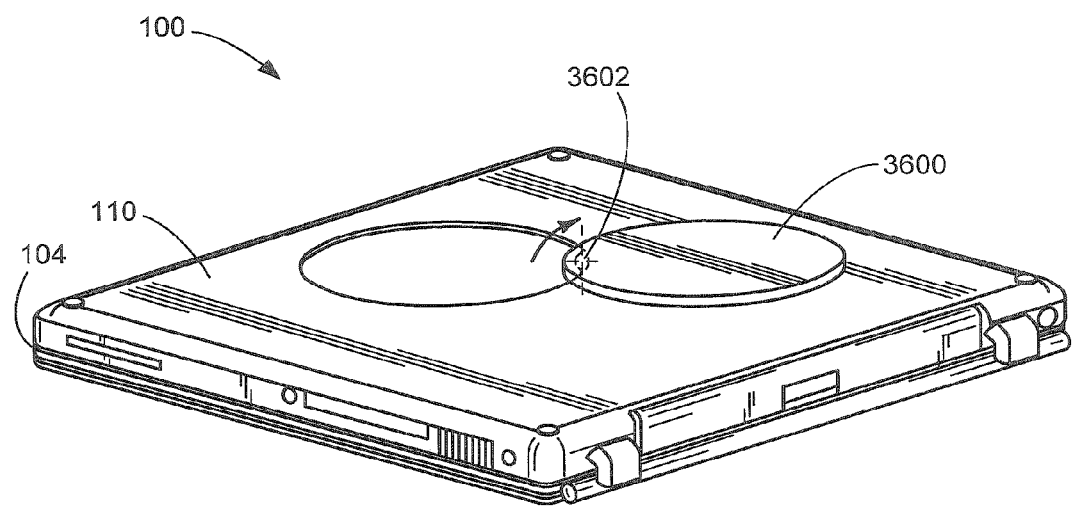
FIG. 36 is a view similar to that of FIG. 3 with a pop-and-rotate door.

Referring now to FIG. 36, therein is shown a view of the portable computer 100 similar to the view shown in FIG. 3, but equipped with a pop-and-rotate door 3600 rather than the door 202 (FIG. 3). The pop-and-rotate door 3600, upon opening, rises above the bottom surface 110 and then rotates on a pivot 3602.

Figure 37:
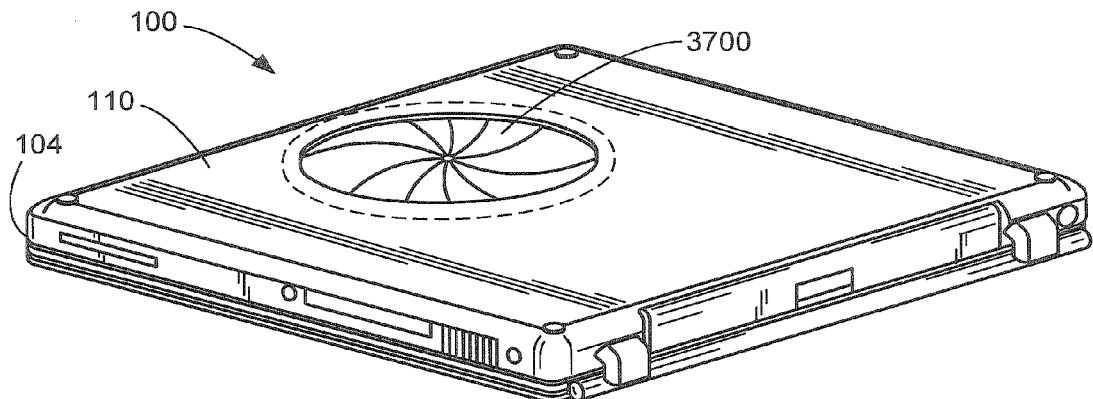
FIG. 37 is a view similar to that of FIG. 3 with an iris door.

Referring now to FIG. 37, therein is shown a view of the portable computer 100 similar to the view shown in FIG. 3, but equipped with an iris door 3700 rather than the door 202 (FIG. 3). The iris door 3700 is composed of several separate pieces that open up like the iris on a camera. Upon opening, the separate pieces rotate out of the way and are protected inside of the housing base 104.

Figure 38:
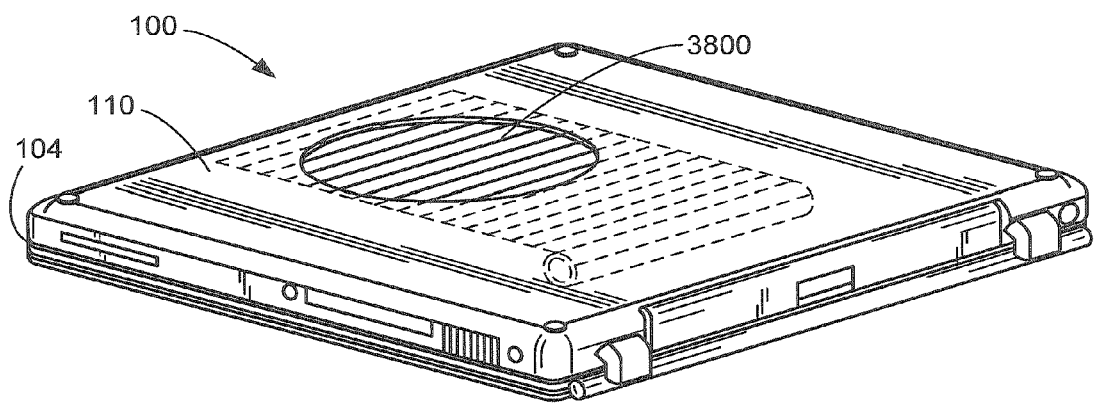
FIG. 38 is a view similar to that of FIG. 3 with a garage door.

Referring now to FIG. 38, therein is shown a view of the portable computer 100 similar to the view shown in FIG. 3, but equipped with a garage door 3800 rather than the door 202 (FIG. 3). The garage door 3800 is sectioned similarly to a folding garage door, for example, as a series of metallic strips connected to one another by a fabric or other flexible carrier underneath the metallic strips. In one embodiment, when the garage door 3800 is opened, it is wound up on a spool on the inside of the housing base 104 and is thereby protected inside the housing base 104.

Figure 39:
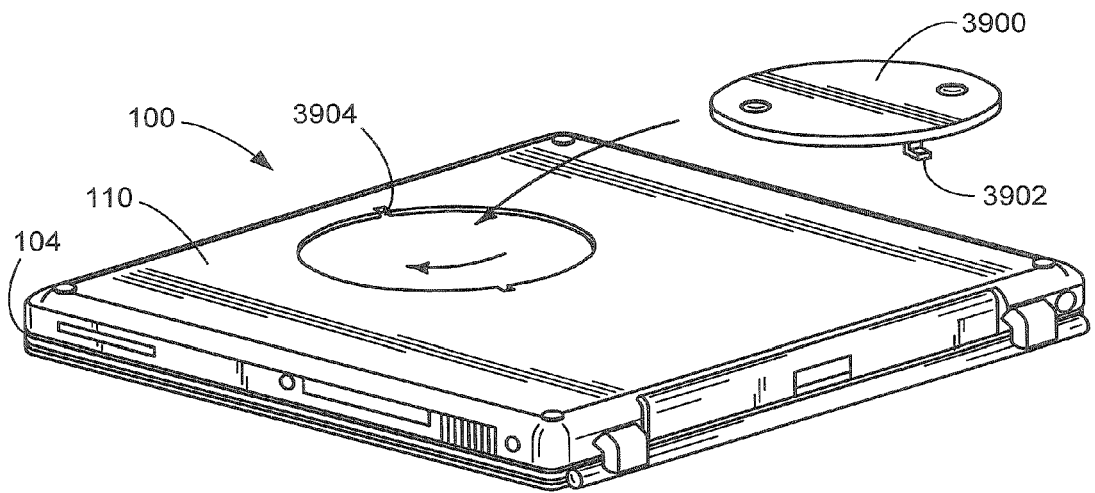
FIG. 39 is a view similar to that of FIG. 3 with a sit-and-spin door.

Referring now to FIG. 39, therein is shown a view of the portable computer 100 similar to the view shown in FIG. 3, but equipped with a sit-and-spin door 3900 rather than the door 202 (FIG. 3). The sit-and-spin door 3900 has a locking configuration similar to a bayonet attachment, with tabs 3902 that pass through slots 3904. The sit-and-spin door 3900 is then rotated between locked and unlocked positions, and when removed from the housing base 104, is entirely separated therefrom. The sit-and-spin door 3900 thus has the advantage that it does not have a vulnerable hinge and does not require space for protection inside the housing base 104.

Figure 40:
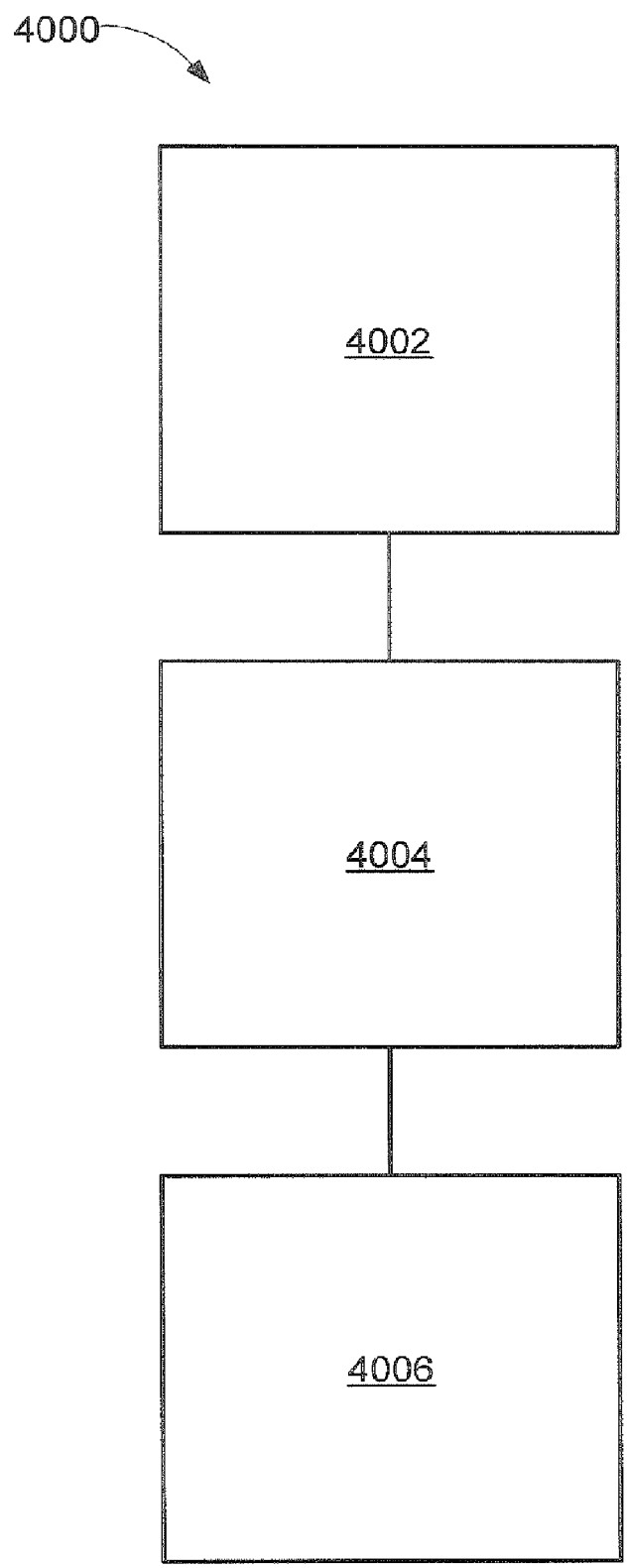
FIG. 40 is a flow chart of a disk drive media access system in accordance with an embodiment of the present invention.

Referring now to FIG. 40, therein is shown a flow chart of a disk drive media access system 4000 in accordance with an embodiment of the present invention. The system 4000 includes opening a media access door to the interior of a disk drive sufficiently for ejection of disk media from the disk drive but insufficiently for manually engaging and removing disk media that is operationally positioned within the disk drive, in a block 4002; keeping the disk media substantially laterally stationary during the opening of the media access door, in a block 4004; and moving the disk media sufficiently for manually engaging the disk media for removing the disk media from the disk drive, in a block 4006.

It has been discovered that the present invention thus has numerous advantages.

A principle advantage is that the present invention provides an access door that opens outwardly from a portable computer and that is nevertheless protected from damage.

Another important advantage is that the present invention provides such a door that includes a door hinge mechanism that is also protected from damage.

A significant advantage of the present invention is that it readily affords media access on major surfaces of a portable device other than the peripheral edge surfaces, notwithstanding the need for vertical rather than lateral access to the drive.

Another advantage of the present invention is that it provides solutions for efficiently and economically providing better user access to disk drives of this sort in an ergonomically user-friendly manner for readily accommodating changeable media for use with such drives.

Yet another important advantage of the present invention is that it valuably supports and services the historical trend of reducing costs, simplifying systems, and increasing performance.

These and other valuable aspects of the present invention consequently further the state of the technology to at least the next level.

Thus, it has been discovered that the disk drive media access system of the present invention furnishes important and heretofore unknown and unavailable solutions, capabilities, and functional advantages for efficiently and economically providing user access to disk drives in an ergonomically user-friendly manner. The resulting configurations are straightforward, cost-effective, uncomplicated, highly versatile and effective, can be implemented by adapting known technologies, and are thus readily suited for efficiently and economically manufacturing and implementing robust disk drive media access systems for portable devices.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

What is claimed is:

1. A disk drive media system, comprising:
   a disk drive;
   a media access door opening to the interior of the disk drive sufficiently for ejection of disk media from the disk drive but insufficiently for manually engaging and removing disk media that is operationally positioned within the disk drive;
   the disk drive being configured to keep the disk media substantially laterally stationary during opening of the media access door; and
   a disk media lifter for moving the disk media sufficiently for manually engaging the disk media for removing the disk media from the disk drive, wherein the disk media lifter further comprises a ribbon pull tab located beneath and engageable against the disk media to move the disk media outwardly toward the media access door.

2. A disk drive media system, comprising:
   a disk drive;
   a media access door opening to the interior of the disk drive sufficiently for ejection of disk media from the disk drive but insufficiently for manually engaging and removing disk media that is operationally positioned within the disk drive;

the disk drive being configured to keep the disk media substantially laterally stationary during opening of the media access door; and a disk media lifter for moving the disk media sufficiently for manually engaging the disk media for removing the disk media from the disk drive, wherein the disk media lifter further comprises a finger grip tab ribbon pull tab located beneath and engageable against the disk media to move the disk media outwardly toward the media access door.

3. A disk drive media system, comprising:

a disk drive;

a media access door opening to the interior of the disk drive sufficiently for ejection of disk media from the disk drive but insufficiently for manually engaging and removing disk media that is operationally positioned within the disk drive;

the disk drive being configured to keep the disk media substantially laterally stationary during opening of the media access door; and a disk media lifter for moving the disk media sufficiently for manually engaging the disk media for removing the disk media from the disk drive, wherein the disk media lifter further comprises a pop-up tab ribbon pull tab located beneath and engageable against the disk media to move the disk media outwardly toward the media access door.

4. A disk drive media system, comprising:

a disk drive;

a media access door opening to the interior of the disk drive sufficiently for ejection of disk media from the disk drive but insufficiently for manually engaging and removing disk media that is operationally positioned within the disk drive;

the disk drive being configured to keep the disk media substantially laterally stationary during opening of the media access door; and a disk media lifter for moving the disk media sufficiently for manually engaging the disk media for removing the disk media from the disk drive, wherein the disk media lifter further comprises a resiliently deformable pop-up tab ribbon pull tab located beneath and engageable against the disk media to move the disk media outwardly toward the media access door.

5. A disk drive media system, comprising:

a disk drive;

a media access door opening to the interior of the disk drive sufficiently for ejection of disk media from the disk drive but insufficiently for manually engaging and removing disk media that is operationally positioned within the disk drive;

the disk drive being configured to keep the disk media substantially laterally stationary during opening of the media access door; and a disk media lifter for moving the disk media sufficiently for manually engaging the disk media for removing the disk media from the disk drive, wherein the disk media lifter further comprises a pop-up button ribbon pull tab located beneath and engageable against the disk media to move the disk media outwardly toward the media access door.

6. A disk drive media system, comprising:

a disk drive;

a media access door opening to the interior of the disk drive sufficiently for ejection of disk media from the disk drive but insufficiently for manually engaging and removing disk media that is operationally positioned within the disk drive;

the disk drive being configured to keep the disk media substantially laterally stationary during opening of the media access door; and a disk media lifter for moving the disk media sufficiently for manually engaging the disk media for removing the disk media from the disk drive, wherein the disk media lifter further comprises a magnetic guide base located beneath and engageable against the disk media to move the disk media outwardly toward the media access door.

7. A disk drive media system, comprising:

a disk drive;

a media access door opening to the interior of the disk drive sufficiently for ejection of disk media from the disk drive but insufficiently for manually engaging and removing disk media that is operationally positioned within the disk drive;

the disk drive being configured to keep the disk media substantially laterally stationary during opening of the media access door; and a disk media lifter for moving the disk media sufficiently for manually engaging the disk media for removing the disk media from the disk drive, wherein the disk media lifter further comprises a tethered magnetic guide base located beneath and engageable against the disk media to move the disk media outwardly toward the media access door.

8. A disk drive media system, comprising:

a disk drive;

a media access door opening to the interior of the disk drive sufficiently for ejection of disk media from the disk drive but insufficiently for manually engaging and removing disk media that is operationally positioned within the disk drive;

the disk drive being configured to keep the disk media substantially laterally stationary during opening of the media access door; and a disk media lifter for moving the disk media sufficiently for manually engaging the disk media for removing the disk media from the disk drive, wherein the disk media lifter further comprises a piano key eject lever located beneath and engageable against the disk media to move the disk media outwardly toward the media access door.

9. A disk drive media system, comprising:

a disk drive;

a media access door opening to the interior of the disk drive sufficiently for ejection of disk media from the disk drive but insufficiently for manually engaging and removing disk media that is operationally positioned within the disk drive;

the disk drive being configured to keep the disk media substantially laterally stationary during opening of the media access door; and a disk media lifter for moving the disk media sufficiently for manually engaging the disk media for removing the disk media from the disk drive, wherein the disk media lifter further comprises a key pusher actuated piano key eject lever located beneath and engageable against the disk media to move the disk media outwardly toward the media access door.

10. A disk drive media access system, comprising:

a media access door;

a magnetic and releasable support for opening the media access door to the interior of a disk drive for disk media access to the disk drive;

the magnetic and releasable support being configured to release the media access door from the vicinity of the disk drive upon application to the media access door of a predetermined force; and the magnetic and releasable support being configured to reattach the media access door to the vicinity of the disk drive following cessation of the predetermined force.

11. The system of claim 10 wherein the magnetic and releasable support further comprises a hinge for pivoted movement with respect to the disk drive.

12. The system of claim 10 wherein the magnetic and releasable support further comprises:

at least one magnet supported in the vicinity of the disk drive; and a magnetically susceptible door arm attached to and supporting the media access door and positioned to be attracted and held by the magnet.

13. The system of claim 10 wherein the magnetic and releasable support further comprises:

at least one magnet pivotally supported in the vicinity of the disk drive;

a magnetically susceptible door arm attached to and supporting the media access door and positioned to be attracted and held by the magnet; and a cradle having a pocket receiving the magnetically susceptible door arm therein in the vicinity of the magnet.

14. The system of claim 10 wherein the magnetic and releasable support further comprises:

a pivotally supported cradle in the vicinity of the disk drive, the cradle having a pocket therein;

at least one magnet supported in the cradle; a magnetically susceptible door arm attached to and supporting the media access door and positionable in the pocket to be attracted and held by the magnet; and a spring assisting rotation of the cradle.

* * * * *